US012687102B2

(12) United States Patent
Finke et al.

(10) Patent No.: US 12,687,102 B2
(45) Date of Patent: Jul. 21, 2026

(54) REPLACEABLE THERMAL NEUTRON ABSORBING SLEEVE FOR NEUTRON DETECTOR

(71) Applicant: Halliburton Energy Services, Inc., Houston, TX (US)

(72) Inventors: Michael Dewayne Finke, Houston, TX (US); Jeffrey James Crawford, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 169 days.

(21) Appl. No.: 18/651,141

(22) Filed: Apr. 30, 2024

(65) Prior Publication Data

US 2025/0334042 A1 Oct. 30, 2025

(51) Int. Cl.
*G01V 5/00* (2024.01)
*E21B 47/017* (2012.01)
*E21B 49/00* (2006.01)
*G01V 5/10* (2006.01)

(52) U.S. Cl.
CPC ............ *E21B 47/017* (2020.05); *E21B 49/00* (2013.01); *G01V 5/101* (2013.01)

(58) Field of Classification Search
CPC ................................. G01V 5/10; G01V 5/101
See application file for complete search history.

(56) References Cited

U.S. PATENT DOCUMENTS 5,134,285 A 7/1992 Perry et al.
5,416,320 A 5/1995 North

| | | |
|---|---|---|
| 11,681,069 B1 | 6/2023 | Mamtimin et al. |
| 2012/0096935 A1 | 4/2012 | Finke et al. |
| 2013/0068526 A1 | 3/2013 | Snyder et al. |
| 2015/0185358 A1* | 7/2015 | Stoller .................. G01V 5/101 |
| | | 250/269.6 |
| 2016/0320521 A1 | 11/2016 | Mauborgne et al. |
| 2020/0370422 A1 | 11/2020 | Finke et al. |
| 2020/0408081 A1 | 12/2020 | Finke et al. |
| 2021/0270125 A1 | 9/2021 | Smith et al. |
| 2022/0043178 A1 | 2/2022 | Knizhnik et al. |
| 2022/0171086 A1 | 6/2022 | Mamtimin et al. |
| 2022/0373484 A1 | 11/2022 | Rego et al. |

OTHER PUBLICATIONS

International Search Report and Written Opinion for International Patent Application No. PCT/US2024/030783 dated Jan. 14, 2025. PDF file. 10 pages.

* cited by examiner

*Primary Examiner* — Dani Fox
(74) *Attorney, Agent, or Firm* — Benjamin Ford; C. Tumey Law Group PLLC-HES

(57) ABSTRACT

A downhole system may include a downhole tubular having a body portion formed between a central bore and a radially outer surface of the downhole tubular, a neutron generator housed within the body portion and configured to emit neutrons, and a gamma ray detector housed within the body portion and configured to detect gamma rays formed via interactions between the emitted neutrons and a downhole formation. The downhole system may also include a sleeve disposed about the radially outer surface of the downhole tubular. The sleeve may be axially positioned over at least a portion of the gamma ray detector. Additionally, the downhole system may include a thermal neutron absorption layer disposed between a radially outer surface of the sleeve and the gamma ray detector.

20 Claims, 11 Drawing Sheets

REPLACEABLE THERMAL NEUTRON ABSORBING SLEEVE FOR NEUTRON DETECTOR

BACKGROUND

Wellbores drilled into subterranean formations may enable recovery of desirable fluids (e.g., hydrocarbons) using a number of different techniques. During drilling operations, slickline operations, or during wireline operations, measurements may be taken to determine the presence of oil, water, gas, and/or the like. One such device that may be utilized for these measurements may be a pulsed neutron tool. The pulsed neutron tool may comprise a pulsed neutron generator (PNG) that may operate and function to transmit neutrons into a formation for either logging while drilling (LWD) or wireline logging measurements.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods for reducing unwanted noise and improving effectiveness of the pulsed neutron logging tool. In particular, the systems and methods may include a pulsed neutron logging tool having a thermal neutron absorption layer configured to absorb neutrons from thermal neutron radiation to reduce unwanted noise and improve effectiveness of the pulsed neutron logging tool. As set forth in greater detail below, the thermal neutron absorption layer may be disposed in any suitable position between a gamma ray detector of the pulsed neutron logging tool and thermal neutron radiation around the pulsed neutron logging tool.

Figure 1:
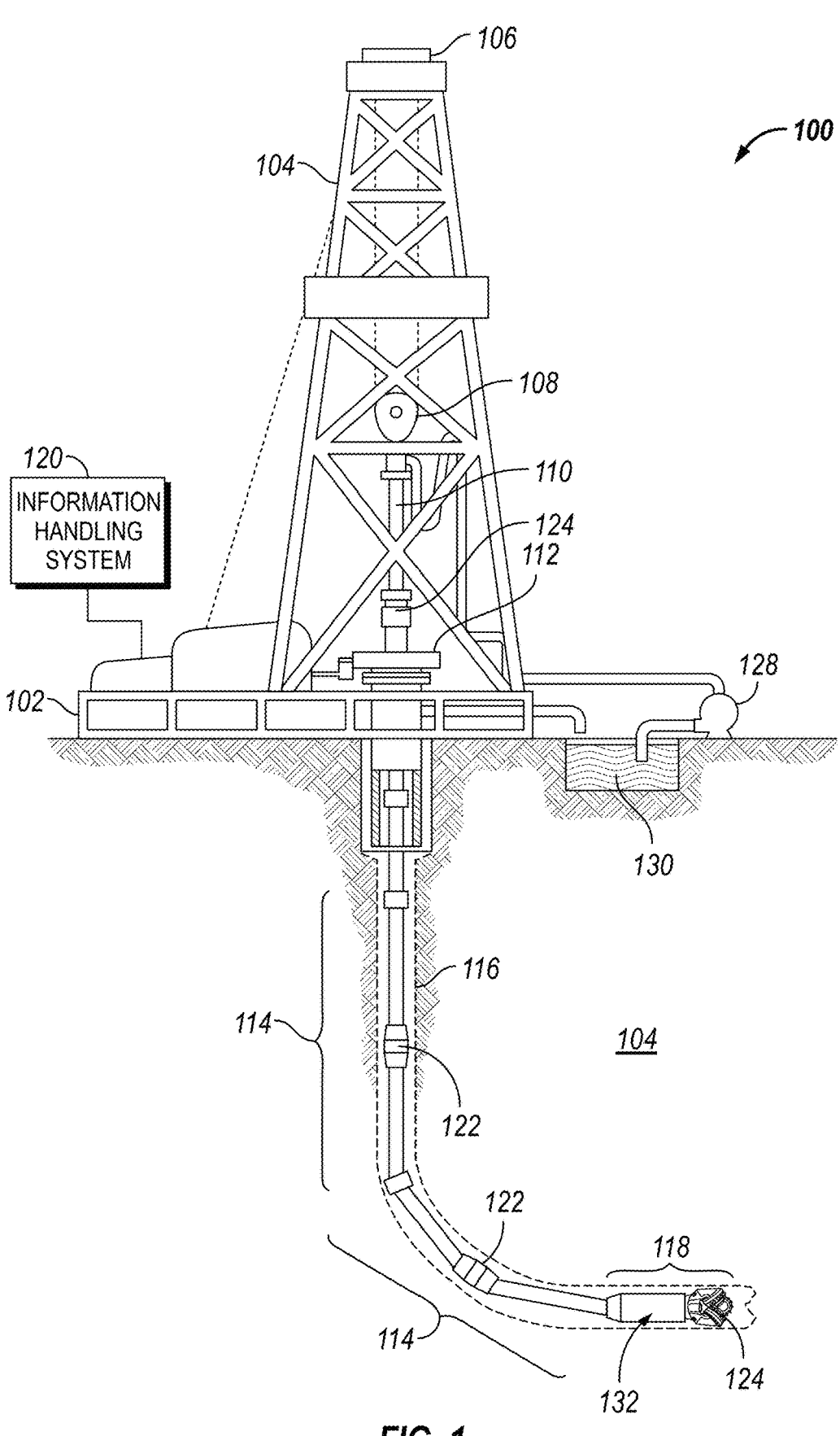
FIG. 1 illustrates a logging while drilling operation utilizing a pulsed neutron logging tool, in accordance with examples of the present disclosure.3

FIG. 1 is a diagram of an example drilling environment. Drilling environment 100 may include platform 102 that supports derrick 104 having a traveling block 108 for raising and lowering top drive 110 and drillstring 114. Top drive 110 supports and rotates drillstring 114 as it is lowered through wellhead 112. In turn, drill bit 124, located at the end of drillstring 114, may create borehole 116. Borehole 116 may be formed through the Earth surface into a subterranean formation 126 in the Earth crust. Bottom-hole assembly 118 may include a pulsed neutron logging tool 132 (e.g., having a scintillator that is $CeBr_3$) for logging while drilling operations. Each of these components is described below. Pulsed neutron logging tool 132 may be a dual-purpose (dual application) gamma-ray spectroscopy logging tool in contemporaneously (e.g., simultaneously) detecting (facilitating measuring) both (1) neutron-induced gamma rays from the subterranean formation 126 and (2) natural gamma rays from the subterranean formation 126. In implementations for logging while drilling, such dual application can reduce complexity of bottom-hole assembly 118 and save rig time in facilitating spectroscopic measurements of both neutron-induced gamma rays and natural gamma rays in a single run (in the same run) into borehole 116.

Platform 102 is a structure which may be used to support one or more other components of drilling environment 100 (e.g., derrick 104). Platform 102 may be designed and constructed from suitable materials (e.g., concrete) which are able to withstand the forces applied by other components (e.g., the weight and counterforces experienced by derrick 104). In any embodiment, platform 102 may be constructed to provide a uniform surface for drilling operations in drilling environment 100.

Derrick 104 is a structure which may support, contain, and/or otherwise facilitate the operation of one or more pieces of the drilling equipment. In any embodiment, derrick 104 may provide support for crown block 106, traveling block 108, and/or any part connected to (and including) drillstring 114. Derrick 104 may be constructed from any suitable materials (e.g., steel) to provide the strength necessary to support those components.

Crown block 106 is one or more simple machine(s) which may be rigidly affixed to derrick 104 and include a set of pulleys (e.g., a "block"), threaded (e.g., "reeved") with a drilling line (e.g., a steel cable), to provide mechanical advantage. Crown block 106 may be disposed vertically above traveling block 108, where traveling block 108 is threaded with the same drilling line.

Traveling block 108 is one or more simple machine(s) which may be movably affixed to derrick 104 and include a set of pulleys, threaded with a drilling line, to provide mechanical advantage. Traveling block 108 may be disposed vertically below crown block 106, where crown block 106 is threaded with the same drilling line. In any embodiment, traveling block 108 may be mechanically coupled to drillstring 114 (e.g., via top drive 110) and allow for drillstring 114 (and/or any component thereof) to be lifted from (and out of) borehole 116. Both crown block 106 and traveling block 108 may use a series of parallel pulleys (e.g., in a "block and tackle" arrangement) to achieve significant mechanical advantage, allowing for the drillstring to handle greater loads (compared to a configuration that uses non-parallel tension). Traveling block 108 may move vertically (e.g., up, down) within derrick 104 via the extension and retraction of the drilling line.

Top drive 110 is a machine which may be configured to rotate drillstring 114. Top drive 110 may be affixed to traveling block 108 and configured to move vertically within derrick 104 (e.g., along with traveling block 108). In any embodiment, the rotation of drillstring 114 (caused by top drive 110) may allow for drillstring 114 to carve borehole 116. Top drive 110 may use one or more motor(s) and gearing mechanism(s) to cause rotations of drillstring 114. In any embodiment, a rotary table (not shown) and a "Kelly" drive (not shown) may be used in addition to, or instead of, top drive 110.

Wellhead 112 is a machine which may include one or more pipes, caps, and/or valves to provide pressure control for contents within borehole 116 (e.g., when fluidly connected to a well (not shown)). In any embodiment, during drilling, wellhead 112 may be equipped with a blowout preventer (not shown) to prevent the flow of higher-pressure fluids (in borehole 116) from escaping to the surface in an uncontrolled manner. Wellhead 112 may be equipped with other ports and/or sensors to monitor pressures within borehole 116 and/or otherwise facilitate drilling operations.

Drillstring 114 is a machine which may be used to carve borehole 116 and/or gather data from borehole 116 and the surrounding geology. Drillstring 114 may include one or more drillpipe(s), one or more repeater(s) 122, and bottom-hole assembly 118. Drillstring 114 may rotate (e.g., via top drive 110) to form and deepen borehole 116 (e.g., via drill bit 124) and/or via one or more motor(s) attached to drillstring 114.

Borehole 116 is a hole in the ground which may be formed by drillstring 114 (and one or more components thereof). Borehole 116 may be partially or fully lined with casing to protect the surrounding ground from the contents of borehole 116, and conversely, to protect borehole 116 from the surrounding ground.

Bottom-hole assembly 118 is a machine which may be equipped with one or more tools for creating, providing structure, and maintaining borehole 116, as well as one or more tools for measuring the surrounding environment (e.g., measurement while drilling (MWD), logging while drilling (LWD)). In any embodiment, bottom-hole assembly 118 may be disposed at (or near) the end of drillstring 114 (e.g., in the most "downhole" portion of borehole 116).

Non-limiting examples of tools that may be included in bottom-hole assembly 118 include a drill bit (e.g., drill bit 124), casing tools (e.g., a shifting tool), a plugging tool, a mud motor, a drill collar (thick-walled steel pipes that provide weight and rigidity to aid the drilling process), actuators (and pistons attached thereto), a steering system, and any measurement tool (e.g., sensors, probes, particle generators, etc.).

Further, bottom-hole assembly 118 may include a telemetry sub to maintain a communications link with the surface (e.g., with information handling system 120). Such telemetry communications may be used for (i) transferring tool measurement data from bottom-hole assembly 118 to surface receivers, and/or (ii) receiving commands (from the surface) to bottom-hole assembly 118 (e.g., for use of one or more tool(s) in bottom-hole assembly 118). In examples, telemetry communications may be at least in part between bottom-hole assembly 118 and information handling system 120.

As illustrated, the information handling system 120 may comprise any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price.

Information handling system 120 may include a processing unit (e.g., microprocessor, central processing unit, etc.) that may process drilling data from rotary steerable system (RSS) 242, discussed below, by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. Non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 120 may also include input device(s) (e.g., keyboard, mouse, touchpad, etc.) and output device(s) (e.g., monitor, printer, etc.). The input device(s) and output device(s) provide a user interface that enables an operator to interact with any device disposed or a part of bottom-hole assembly 118, discussed below, and/or software executed by a processing unit. For example, information handling system 120 may enable an operator to select analysis options, view collected log data, view analysis results, and/or perform other tasks.

Non-limiting examples of techniques for transferring tool measurement data (to the surface) include mud pulse telemetry and through-wall acoustic signaling. For through-wall acoustic signaling, one or more repeater(s) 122 may detect, amplify, and re-transmit signals from bottom-hole assembly 118 to the surface (e.g., to information handling system 120), and conversely, from the surface (e.g., from information handling system 120) to bottom-hole assembly 118.

Repeater 122 is a device which may be used to receive and send signals from one component of drilling environment 100 to another component of drilling environment 100. As a non-limiting example, repeater 122 may be used to receive a signal from a tool on bottom-hole assembly 118 and send that signal to information handling system 120. Two or more repeaters 122 may be used together, in series, such that a signal to/from bottom-hole assembly 118 may be relayed through two or more repeaters 122 before reaching its destination.

A transducer is a device that may work with repeater 122 to transfer information from the surface to bottom-hole assembly 118. A transducer may be configured to convert non-digital data (e.g., vibrations, other analog data) into a digital form suitable for information handling system 120. As a non-limiting example, the one or more transducer(s) may convert signals between mechanical and electrical forms, enabling information handling system 120 to receive the signals from a telemetry sub, on bottom-hole assembly 118, and conversely, transmit a downlink signal to the telemetry sub on bottom-hole assembly 118. In any embodiment, the transducer may be located at the surface and/or any part of drillstring 114 (e.g., as part of bottom-hole assembly 118).

Drill bit 124 is a machine which may be used to cut through, scrape, and/or crush (i.e., break apart) materials in the ground (e.g., rocks, dirt, clay, etc.). Drill bit 124 may be disposed at the frontmost point of drillstring 114 and bottom-hole assembly 118. In any embodiment, drill bit 124 may include one or more cutting edges (e.g., hardened metal points, surfaces, blades, protrusions, etc.) to form a geometry which aids in breaking ground materials loose and further crushing that material into smaller sizes. In any embodiment, drill bit 124 may be rotated and forced into (i.e., pushed against) the ground material to cause the cutting, scraping, and crushing action. The rotations of drill bit 124 may be caused by top drive 110 and/or one or more motor(s) located on drillstring 114 (e.g., on bottom-hole assembly 118).

Pump 128 is a machine that may be used to circulate drilling fluid 130 from a reservoir, through a feed pipe, to derrick 104, to the interior of drillstring 114, out through drill bit 124 (through orifices, not shown), back upward through borehole 116 (around drillstring 114), and back into the reservoir. In any embodiment, any appropriate pump 128 may be used (e.g., centrifugal, gear, etc.) which is powered by any suitable means (e.g., electricity, combustible fuel, etc.).

Drilling fluid 130 is a liquid which may be pumped through drillstring 114 and borehole 116 to collect drill cuttings, debris, and/or other ground material from the end of borehole 116 (e.g., the volume most recently hollowed by drill bit 124). Further, drilling fluid 130 may provide conductive cooling to drill bit 124 (and/or bottom-hole assembly 118). In any embodiment, drilling fluid 130 may be circulated via pump 128 and filtered to remove unwanted debris.

During drilling operations, bottom-hole assembly may comprise, at least in part, a pulsed neutron logging tool 132. This may allow for logging while drilling operations to be performed. Measurements taken by pulsed neutron logging tool 132 may be gathered and/or processed by information handling system 120. For example, measurements taken by pulsed neutron logging tool 132 may be sent to information handling system 120 where they may be stored on memory and then processed. The processing may be performed real-time during data acquisition or after recovery of pulsed neutron logging tool 132. Processing may alternatively occur downhole on an information handling system disposed on and/or near pulsed neutron logging tool 132 or may occur both downhole and at surface. Information handling system 120 may process the signals, and the information contained therein may be displayed for an operator to observe and stored for future processing and reference. Information handling system 120 may also contain an apparatus for supplying control signals and power to pulsed neutron logging tool 132. Although illustrated as disposed on bottom-hole assembly 118 in a drilling operation, pulsed neutron logging tool 132 may also be disposed in borehole 116 in a wireline operation. Moreover, as mentioned, pulsed neutron logging tool 132 can have a scintillator detector having a scintillator (scintillation crystal) that is or includes $CeBr_3$.

Figure 2:
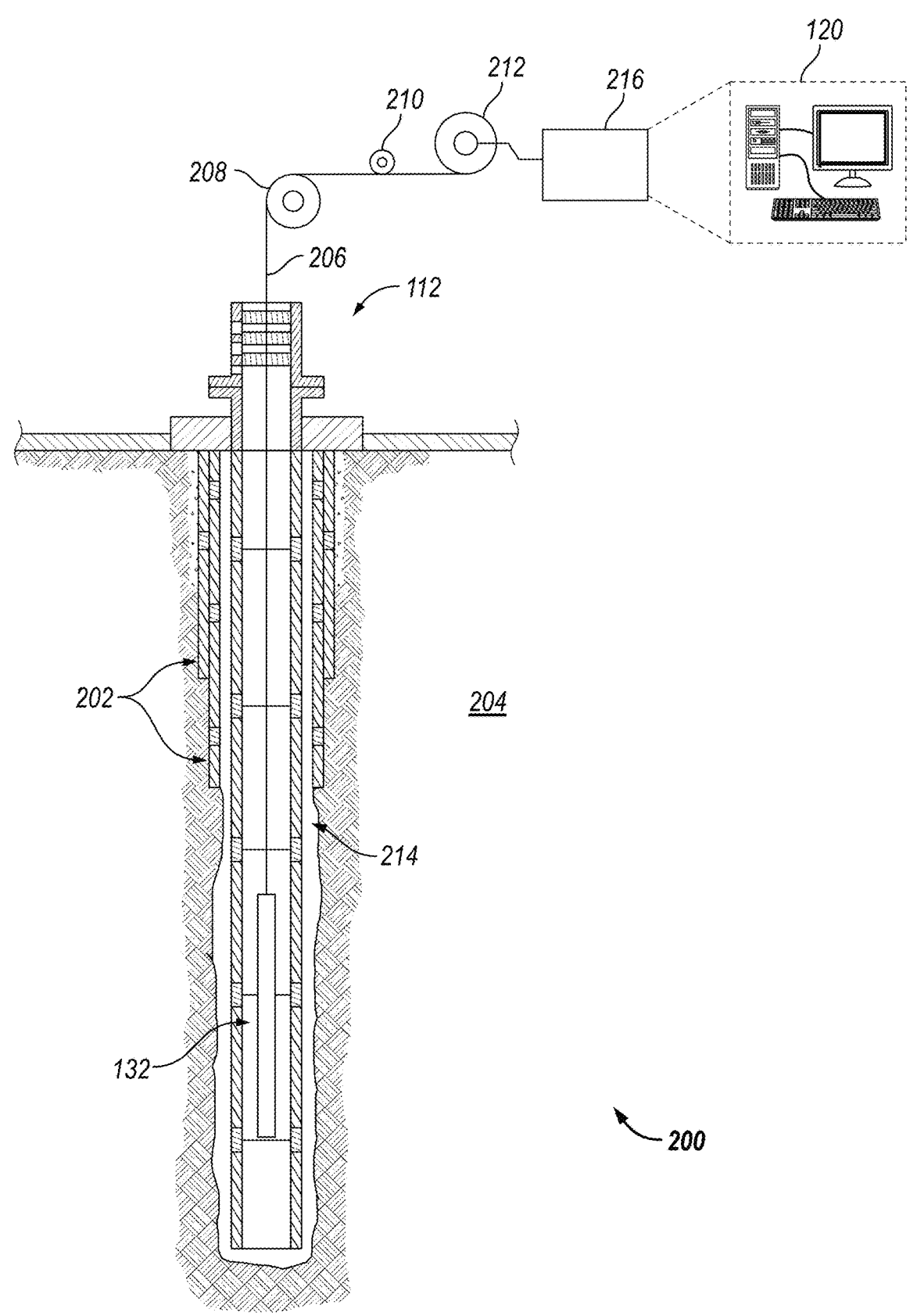
FIG. 2 illustrates the pulsed neutron logging tool in a wireline operation, in accordance with examples of the present disclosure.

FIG. 2 illustrates a wireline operation 200, as disclosed herein, utilizing a pulsed neutron logging tool 132. Pulsed neutron logging tool 132 can have a scintillator detector in which the scintillator may be or include $CeBr_3$. FIG. 2 illustrates a cross-section of borehole 116 with a pulsed neutron logging tool 132 traveling through casing string 202. Borehole 116 may traverse through subterranean formation 204 as a vertical well and/or a horizontal well. Pulsed neutron logging tool 132 may be suspended by a conveyance 206, which communicates power from a logging center 216 to pulsed neutron logging tool 132 and communicates telemetry from pulsed neutron logging tool 132 to information handling system 120. In examples, pulsed neutron logging tool 132 may be operatively coupled to a conveyance 206 (e.g., wireline, slickline, coiled tubing, pipe, downhole tractor, and/or the like) which may provide mechanical suspension, as well as electrical connectivity, for pulsed neutron logging tool 132. Conveyance 206 and pulsed neutron logging tool 132 may extend within casing string 202 to a depth within borehole 116. Conveyance 206, which may include one or more electrical conductors, may exit wellhead 112, may pass around pulley 208, may engage odometer 210, and may be reeled onto winch 212, which may be employed to raise and lower the tool assembly in borehole 116. Wellhead 112 may allow for entry into borehole 116 and placement of pulsed neutron logging tool 132 into pipe string 214. The position of pulsed neutron logging tool 132 may be monitored in a number of ways, including an inertial tracker in pulsed neutron logging tool 132 and a paid-out conveyance length monitor in logging facility 216.

Multiple such measurements may be desirable to enable the system to compensate for varying cable tension and cable stretch due to other factors. Information handling system 120 in logging facility 216 collects telemetry and position measurements and provides position-dependent logs of measurements from pulsed neutron logging tool 132 and values that may be derived therefrom.

Pulsed neutron logging tool 132 generally includes multiple instruments for measuring a variety of downhole parameters. Wheels, bow springs, fins, pads, or other centralizing mechanisms may be employed to keep pulsed neutron logging tool 132 near the borehole axis during measurement operations. During measurement operations, generally, measurements may be performed as pulsed neutron logging tool 132 is drawn up hole at a constant rate. The parameters and instruments may vary depending on the needs of the measurement operation.

Measurements taken by pulsed neutron logging tool 132 may be gathered and/or processed by information handling system 120. For example, signals recorded by pulsed neutron logging tool 132 may be sent to information handling system 120 where they may be stored on memory and then processed. The processing may be performed real-time during data acquisition or after recovery of pulsed neutron logging tool 132. Processing may alternatively occur downhole on an information handling system disposed on pulsed neutron logging tool 132 or may occur both downhole and at surface. In some examples, signals recorded by pulsed neutron logging tool 132 may be conducted to information handling system 120 by way of conveyance 206. Information handling system 120 may process the signals, and the information contained therein may be displayed for an operator to observe and stored for future processing and reference. Information handling system 120 may also contain an apparatus for supplying control signals and power to pulsed neutron logging tool 132.

In wireline operations 200, a digital telemetry system may be employed, wherein an electrical circuit may be used to both supply power to pulsed neutron logging tool 132 and to transfer data between information handling system 120 and pulsed neutron logging tool 132. A DC voltage may be provided to pulsed neutron logging tool 132 by a power supply located above ground level, and data may be coupled to the DC power conductor by a baseband current pulse system. Alternatively, pulsed neutron logging tool 132 may be powered by batteries located within the downhole tool assembly, and/or the data provided by pulsed neutron logging tool 132 may be stored within the downhole tool assembly, rather than transmitted to the surface during logging.

Figure 3:
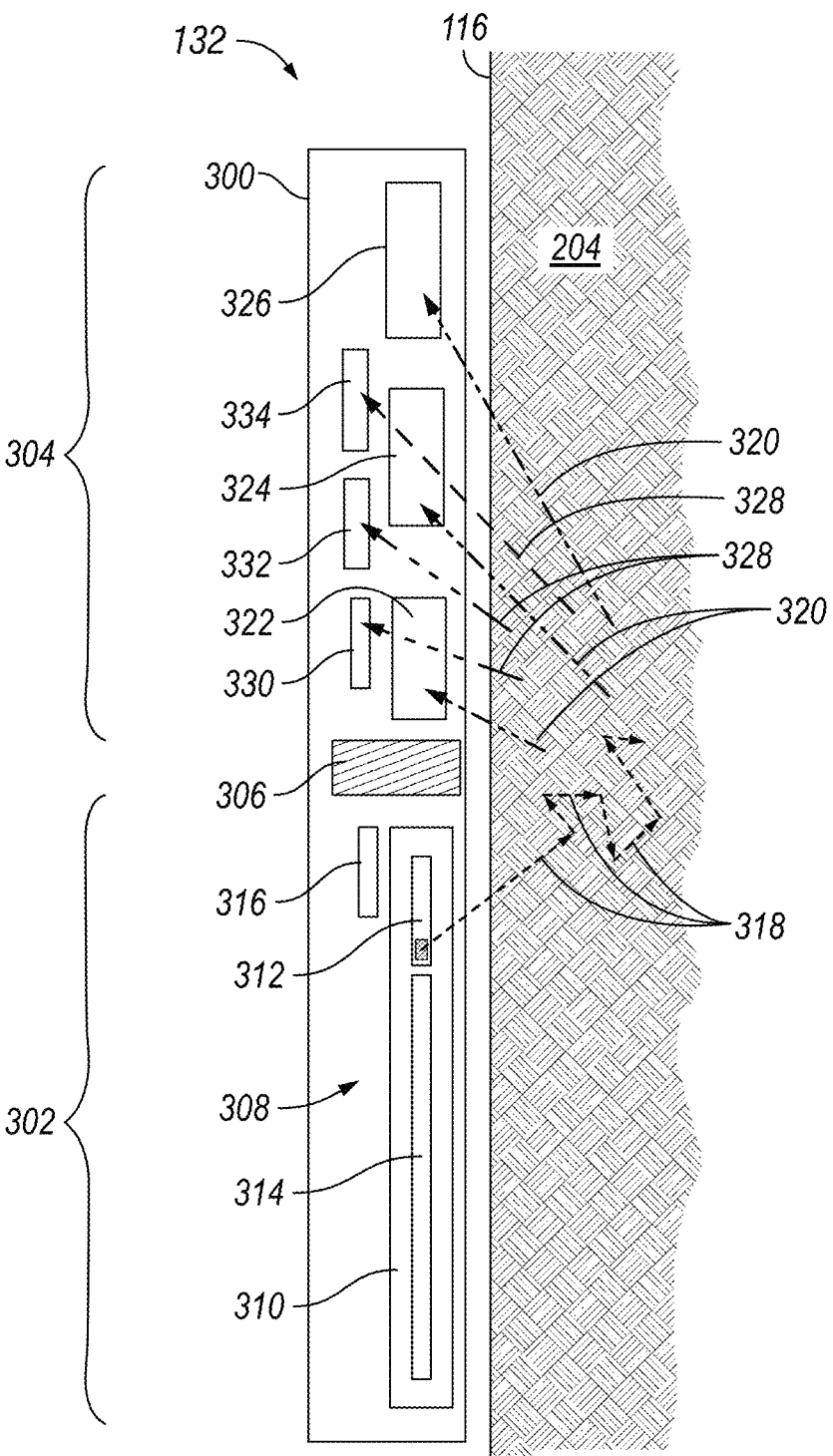
FIG. 3 is a diagram of illustrative embodiments of a pulsed neutron logging tool.

FIG. 3 illustrates pulsed neutron logging tool 132 disposed in borehole 116. It should be noted, as discussed above, that pulsed neutron logging tool 132 may be disposed on a bottom-hole assembly 118 (e.g., referring to FIG. 1) in a logging while drilling operation or utilized in a wireline operation (e.g., referring to FIG. 2). Additionally, the orientation of pulsed neutron logging tool 132, whether the generator is disposed above or below the detectors, is inconsequential.

With continued reference to FIG. 3, pulsed neutron logging tool 132 may comprise an outer housing 300 which may be formed from a heavy metal such as steel, Inconel, etc. Housing 300 may protect the internal devices of pulsed neutron logging tool 132 from the downhole environment that pulsed neutron logging tool 132 may experience in borehole 116. As illustrated, pulsed neutron logging tool 132 may be divided into a generation area 302 and a detection area 304 that are separated by shielding 306. From generation area 302, neutrons may be generated and broadcast into formation 204 (referring to FIG. 2). Detection area 304 may be operated and function to detect gamma rays that may originate from formation 204 naturally or induced by the broadcast of neutrons into formation 204.

Generation area 302 may comprise a pulsed neutron generator 308 that may be packaged within $SF_6$ housing 310. $SF_6$ housing 310 may be comprised of a heavy metal like stainless steel, etc. As noted above, within $SF_6$ housing 310 may be a pulsed neutron generator 308 that may further comprise a neutron tube 312, which generates neutrons for broadcasting, and a high voltage (HV) ladder power supply 314 that may be utilized to power neutron tube 312. In other examples, pulsed neutron generator 308 may be replaced with a continuous neutron source such as Americium-Beryllium (Am—Be) chemical source. Outside of $SF_6$ housing 310 may be a fast neutron monitor 316, that may be utilized to monitor the broadcasting of neutrons 318 from generation area 302 into formation 204. For example, during operations pulsed neutron logging tool 132 may generate pulses of high energy neutrons that radiate from pulsed neutron generator 308 into the surrounding environment including borehole 116 and formation 204. The highly energetic neutrons 318 entering the surrounding environment interact with atomic nuclei, inducing gamma ray radiation. Induced inelastic and capture gamma rays 320 and thermal neutrons 328 may be sensed and recorded by detection area 304. The scattered neutrons and gamma ray spectrum may be measured to determine properties of borehole 116 and formation 204. Through processing, the measurements may be utilized to identify oil and gas in formation 204 as well as determining the flow in production wells. As illustrated, neutrons 318 may be broadcasted into formation 204, wherein neutrons 318 may interact with material within formation 204 to create inelastic and capture gamma rays 320, discussed in greater detail below. Inelastic and capture gamma rays 320 may be detected, sensed, and/or measured by devices within detection area 304 of pulsed neutron logging tool 132.

Detection area 304 may comprise a number of devices that may be utilized to detect, sense, and/or measure inelastic and capture gamma rays 320. As illustrated, a number of gamma ray scintillator detectors (e.g., gamma ray detectors) may be utilized, which implement a scintillation crystal coupled to a photomultiplier tube. In examples, gamma ray scintillator detectors may be identified as a near gamma ray scintillator detector 322, a far gamma ray scintillator detector 324, and a long gamma ray scintillator detector 326. Identification of each scintillator detector as near, far, and long is due to the distance from neutron generator 308. For example, the closest scintillator detector to neutron generator 308 is "near," the second closest is "far", and the third closest is "long." This nomenclature may also be utilized for thermal neutron detectors that may also be disposed within detection area 304 and may operate and function to detect thermal neutrons 328 that may originate from formation 204 during the interaction of neutrons 318 with material within formation 204. For example, neutron detectors may operate and function to count thermal (around about 0.025 eV) and/or epithermal (between about 0.1 eV and 100 eV) neutrons. Suitable neutron detectors include Helium-3 (He-3) filled proportional counters, though other neutron counters may also be used. Thus, within detection area 304 may be a near thermal neutron detector 330, a far thermal neutron detector 332, and a long thermal neutron detector 334. As noted above, detection area 304 may be separated from generation area 302 by shielding 306.

Shielding 306 may be a structure formed of a heavy metal like tungsten. This material may operate and function to prevent neutrons 318 that may be generated from pulsed neutron generator 308 from being detected by the detectors in detection area 304. Without shielding 306, neutrons 318 generated from pulsed neutron generator 308 may saturate all detectors within detection area 304 and prevent the detection and measurement of gamma rays and neutrons from formation 204.

Figures 4A, 4B, 4C, 4D:
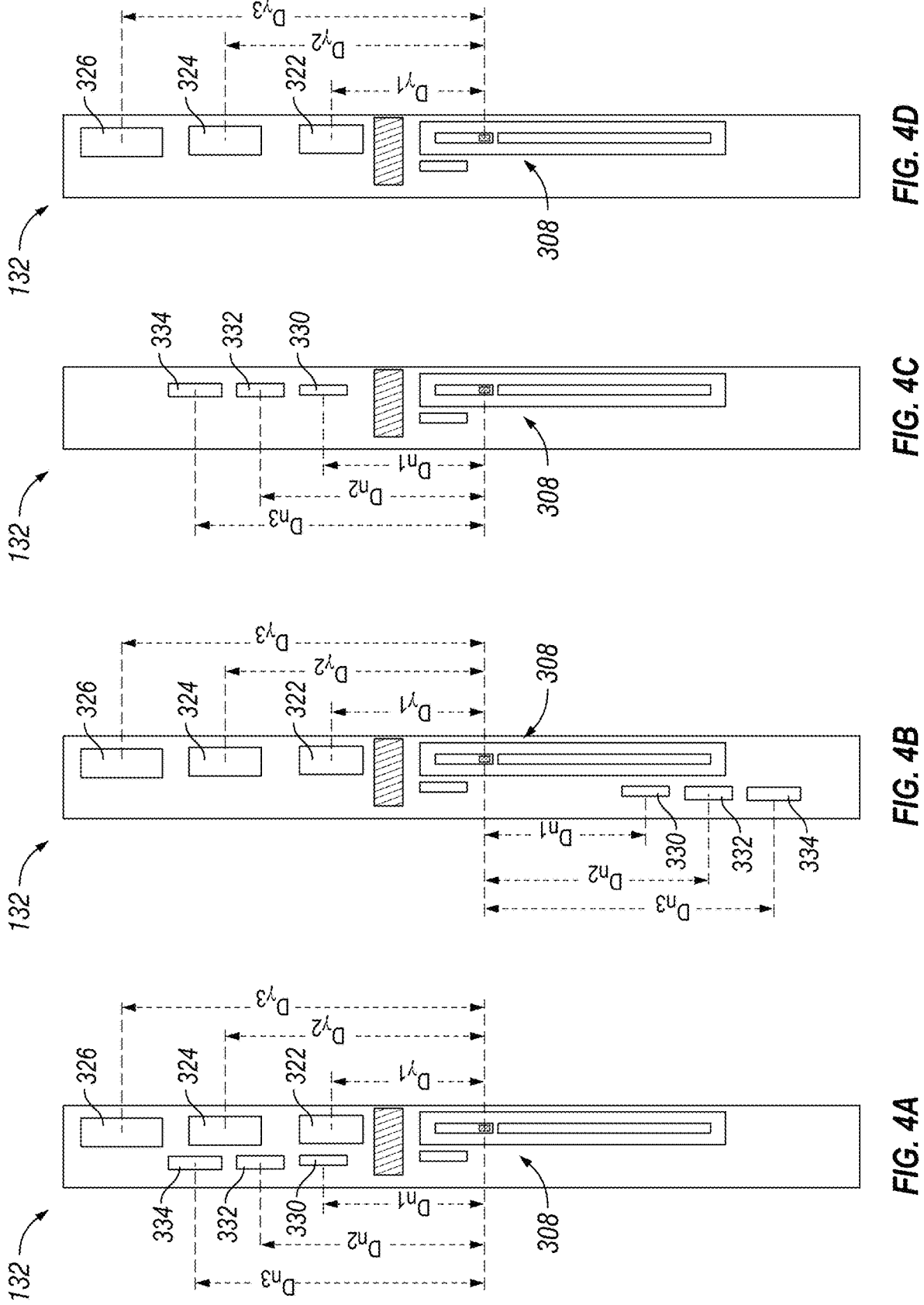
FIG. 4A-4D are diagrams of alternative embodiments of a pulsed neutron logging tool.

FIGS. 4A-4D illustrate different embodiments of pulsed neutron logging tool 132. FIG. 4A illustrates an embodiment shown in FIG. 3. In this embodiment, the distance from pulsed neutron generator 308 to near thermal neutron detector 330 is $D_{n1}$, to far thermal neutron detector 332 is $D_{n2}$, and to long thermal neutron detector 334 is $D_{n3}$. Further, the distance from pulsed neutron generator 308 to near gamma ray scintillator detector 322 is $D_{\gamma1}$, a far gamma ray scintillator detector 324 is $D_{\gamma2}$, and a long gamma ray scintillator detector 326 is $D_{\gamma3}$. FIG. 4B illustrates another embodiment in which the distances $D_{n1}$, $D_{n2}$, $D_{n3}$ from pulsed neutron generator 308 to each thermal neutron detector 330, 332, 334 have changed as each thermal neutron detector is now disposed within generation area 302. FIG. 4C illustrates an embodiment where only thermal neutron detectors 330, 332, 334 with distances $D_{n1}$, $D_{n2}$, $D_{n3}$ are utilized and FIG. 4D illustrates an embodiment where only gamma ray scintillator detectors 332, 324, and 326 distances $D_{\gamma1}$, $D_{\gamma2}$, $D_{\gamma3}$ are utilized.

Multiple detectors of pulsed neutron logging tool 132, may enable pulsed neutron logging tool 132 to measure properties of formation 204 and borehole 116 (e.g., referring to FIG. 3) using any of the existing multiple-spacing techniques. In addition, the presence of gamma ray detectors which have proper distances from pulsed neutron generator 308, may enable the measurement of elemental gamma ray spectroscopy.

As discussed above, during measurement operations, neutrons 318 (e.g., referring to FIG. 3) emitted from neutron source or pulsed neutron generator 308 undergo neutron scattering and/or nuclear absorption when interacting with matter. Scattering may either be elastic (n, n) or inelastic (n, n'). In an elastic interaction a fraction of the neutrons kinetic energy is transferred to the nucleus. An inelastic interaction is similar, except the nucleus undergoes an internal rearrangement. Additionally, neutrons may also undergo an absorption interaction. During interactions, the elastic cross section is nearly constant, whereas the inelastic scattering cross section and absorption cross sections are proportional to the reciprocal of the neutron speed. For example, inelastic scatterings appear for fast neutrons in the MeV energy range, whereas absorptions happen when neutrons slowed down in the eV energy range.

Figure 5:
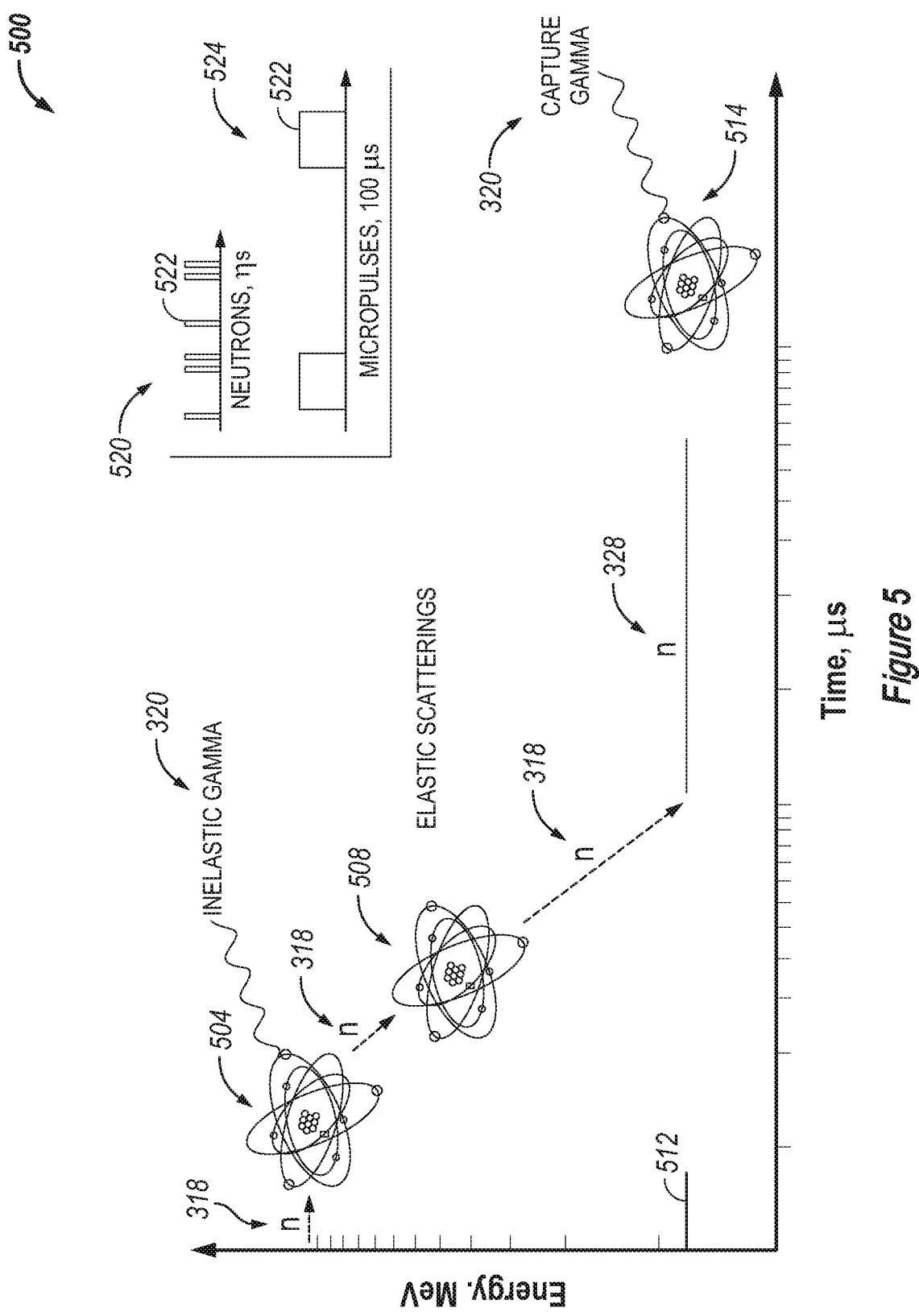
FIG. 5 illustrates the energy of a neutron as it interacts in the present disclosure.

FIG. 5 illustrates a graph 500 that depicts different scattering by a neutron 318. As illustrated, neutron 318 may be traveling at a fast speed with high kinetic energy and interacts with nuclei 504, releasing inelastic gamma ray 320 and lowering the energy state of neutron 318. After the interaction, neutron 318 contains too much energy to be absorbed, thus continuing its path until it interacts with nuclei 508 releasing inelastic gamma ray 320 and again lowering its energy state again. After the interaction, neutron 318 has kinetic energy close to target energy 512, becomes a thermal neutron 328. Thus, when neutron 328 at target energy 512 interacts with nuclei 514 it will be captured. This interaction results in nucleus 514 being rearranged to contain previously traveling neutron 328 and an emitted capture gamma ray 320. Sensing these events with pulsed neutron logging tool 132 using detection area 304 may allow for the identification of oil, gas, and/or water in borehole 116 and formation 204 (e.g., referring to FIG. 3).

With continued reference to FIG. 5, the neutron to gamma ray timing information may be utilized during measurement operations in which a pulsing neutron generator is utilized. In a sub-µs time domain, inelastic gamma rays dominate, whereas in a 10-1000 µs time range, there are only capture gamma rays. Insert 520 on FIG. 5 illustrates an example of neutrons in a neutron pulse 522 and insert 524 shows the relationship of two adjacent neutron pulses 522 with a given pulse width and timing interval. Pulsing schemes allow isolation of inelastic and capture gamma rays 320, and then allow elemental determinations of different nuclei in the bore hole, formation, or fluids.

During measurement operations, pulsed neutron logging tool 132 may take any number of measurements of inelastic and capture gamma rays 320 and/or thermal neutrons 328 (e.g., referring to FIG. 3). These measurements may be further processed by additional methods and systems that may utilize information handling system 120.

Figure 6:
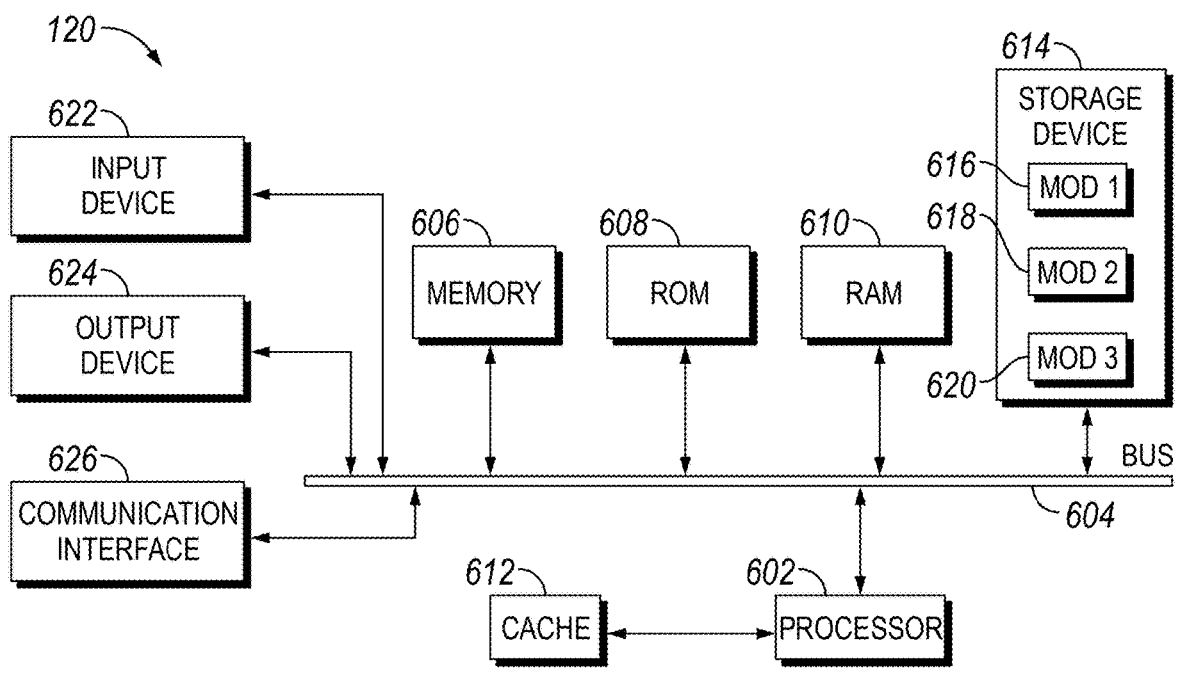
FIG. 6 illustrates a schematic of an information handling system.

FIG. 6 further illustrates an example information handling system 120 which may be employed to perform various steps, methods, and techniques disclosed herein. Persons of ordinary skill in the art will readily appreciate that other system examples are possible. As illustrated, information handling system 120 includes a processing unit (CPU or processor) 602 and a system bus 604 that couples various system components including system memory 606 such as read only memory (ROM) 608 and random-access memory (RAM) 610 to processor 602. Processors disclosed herein may all be forms of this processor 602. Information handling system 120 may include a cache 612 of high-speed memory connected directly with, in close proximity to, or integrated as part of processor 602. Information handling system 120 copies data from memory 606 and/or storage device 614 to cache 612 for quick access by processor 602. In this way, cache 612 provides a performance boost that avoids processor 602 delays while waiting for data. These and other modules may control or be configured to control processor 602 to perform various operations or actions. Other system memory 606 may be available for use as well. Memory 606 may include multiple different types of memory with different performance characteristics. It may be appreciated that the disclosure may operate on information handling system 120 with more than one processor 602 or on a group or cluster of computing devices networked together to provide greater processing capability. Processor 602 may include any general-purpose processor and a hardware module or software module, such as first module 616, second module 618, and third module 620 stored in storage device 614, configured to control processor 602 as well as a special-purpose processor where software instructions are incorporated into processor 602. Processor 602 may be a self-contained computing system, containing multiple cores or processors, a bus, memory controller, cache, etc. A multi-core processor may be symmetric or asymmetric. Processor 602 may include multiple processors, such as a system having multiple, physically separate processors in different sockets, or a system having multiple processor cores on a single physical chip. Similarly, processor 602 may include multiple distributed processors located in multiple separate computing devices but working together such as via a communications network. Multiple processors or processor cores may share resources such as memory 606 or cache 612 or may operate using independent resources. Processor 602 may include one or more state machines, an application specific integrated circuit (ASIC), or a programmable gate array (PGA) including a field PGA (FPGA).

Each individual component discussed above may be coupled to system bus 604, which may connect each and every individual component to each other. System bus 604 may be any of several types of bus structures including a memory bus or memory controller, a peripheral bus, and a local bus using any of a variety of bus architectures. A basic input/output (BIOS) stored in ROM 608 or the like, may provide the basic routine that helps to transfer information between elements within information handling system 120, such as during start-up. Information handling system 120 further includes storage devices 614 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. Storage device 614 may include software modules 616, 618, and 620 for controlling processor 602. Information handling system 120 may include other hardware or software modules. Storage device 614 is connected to the system bus 604 by a drive interface. The drives and the associated computer-readable storage devices provide nonvolatile storage of computer-readable instructions, data structures, program modules and other data for information handling system 120. In one aspect, a hardware module that performs a particular function includes the software component stored in a tangible computer-readable storage device in connection with hardware components, such as processor 602, system bus 604, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 120 is a small, handheld computing device, a desktop computer, or a computer server. When processor 602 executes instructions to perform "operations", processor 602 may perform the operations directly and/or facilitate, direct, or cooperate with another device or component to perform the operations.

As illustrated, information handling system 120 employs storage device 614, which may be a hard disk or other types of computer-readable storage devices which may store data that are accessible by a computer, such as magnetic cassettes, flash memory cards, digital versatile disks (DVDs), cartridges, random access memories (RAMs) 610, read only memory (ROM) 608, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 120, an input device 622 represents any number of input mechanisms, such as a microphone for speech, a touch-sensitive screen for gesture or graphical input, keyboard, mouse, motion input, speech and so forth. Additionally, input device 622 may receive one or more measurements from bottom-hole assembly 118 (e.g., referring to FIG. 1), discussed above. An output device 624 may also be one or more of a number of output mechanisms known to those of skill in the art. In some instances, multimodal systems enable a user to provide multiple types of input to communicate with information handling system 120. Communications interface 626 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 602, that is purpose-built to operate as an equivalent to software executing on a general-purpose processor. For example, the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 608 for storing software performing the operations described below, and random-access memory (RAM) 610 for storing results. Very large-scale integration (VLSI) hardware embodiments, as well as custom VLSI circuitry in combination with a general-purpose DSP circuit, may also be provided.

Figure 7:
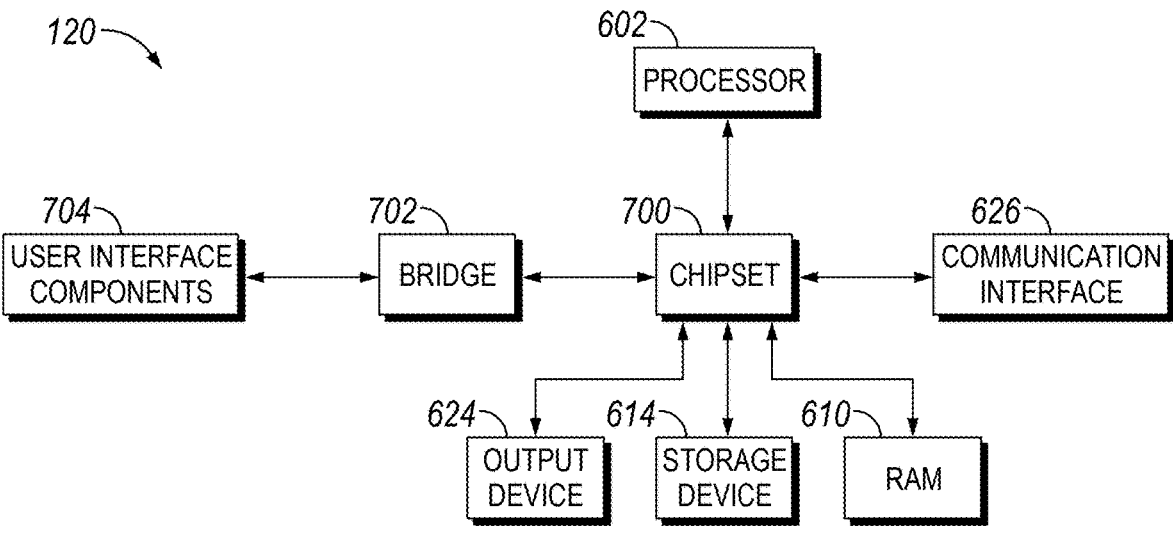
FIG. 7 illustrates a schematic of a chip set.

FIG. 7 illustrates an example information handling system 120 having a chipset architecture that may be used in executing the described method and generating and displaying a graphical user interface (GUI). Information handling system 120 is an example of computer hardware, software, and firmware that may be used to implement the disclosed technology. Information handling system 120 may include a processor 602, representative of any number of physically and/or logically distinct resources capable of executing software, firmware, and hardware configured to perform identified computations. Processor 602 may communicate with a chipset 700 that may control input to and output from processor 602. In this example, chipset 700 outputs information to output device 624, such as a display, and may read and write information to storage device 614, which may include, for example, magnetic media, and solid-state media.

Chipset 700 may also read data from and write data to RAM 610. A bridge 702 for interfacing with a variety of user interface components 704 may be provided for interfacing with chipset 700. Such user interface components 704 may include a keyboard, a microphone, touch detection and processing circuitry, a pointing device, such as a mouse, and so on. In general, inputs to information handling system 120 may come from any of a variety of sources, machine generated and/or human generated.

Chipset 700 may also interface with one or more communication interfaces 626 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 602 analyzing data stored in storage device 614 or RAM 610. Further, information handling system 120 receives inputs from a user via user interface components 704 and executes appropriate functions, such as browsing functions by interpreting these inputs using processor 602.

In examples, information handling system 120 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Figure 8:
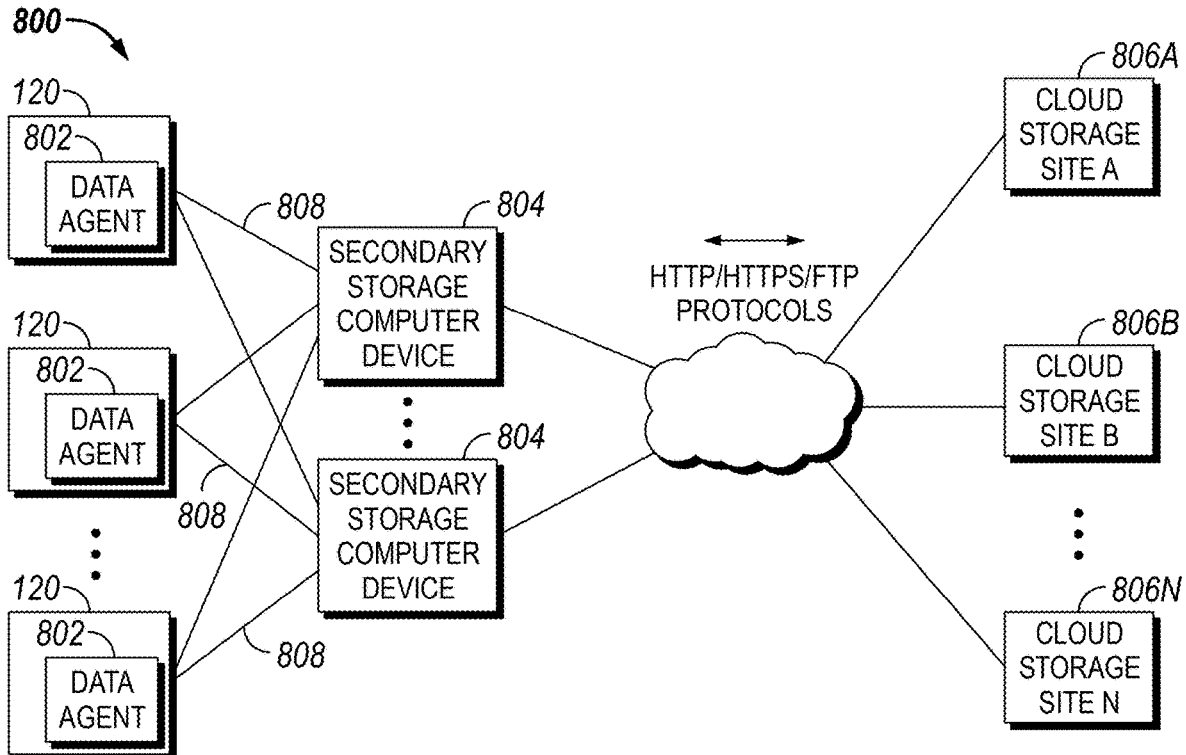
FIG. 8 illustrates a computing network.

FIG. 8 illustrates an example of one arrangement of resources in a computing network 800 that may employ the processes and techniques described herein, although many others are of course possible. As noted above, an information handling system 120, as part of their function, may utilize data, which includes files, directories, metadata (e.g., access control list (ACLS) creation/edit dates associated with the data, etc.), and other data objects. The data on the information handling system 120 is typically a primary copy (e.g., a production copy). During a copy, backup, archive or other storage operation, information handling system 120 may send a copy of some data objects (or some components thereof) to a secondary storage computing device 804 by utilizing one or more data agents 802.

A data agent 802 may be a desktop application, website application, or any software-based application that is run on information handling system 120. As illustrated, information handling system 120 may be disposed at any rig site (e.g., referring to FIG. 1), off site location, or repair and manufacturing center. The data agent may communicate with a secondary storage computing device 804 using communication protocol 808 in a wired or wireless system. Communication protocol 808 may function and operate as an input to a website application. In the website application, field data related to pre- and post-operations, generated DTCs, notes, and the like may be uploaded. Additionally, information handling system 120 may utilize communication protocol 808 to access processed measurements, operations with similar DTCs, troubleshooting findings, historical run data, and/or the like. This information is accessed from secondary storage computing device 804 by data agent 802, which is loaded on information handling system 120.

Secondary storage computing device 804 may operate and function to create secondary copies of primary data objects (or some components thereof) in various cloud storage sites 806A-N. Additionally, secondary storage computing device 804 may run determinative algorithms on data uploaded from one or more information handling systems 120, discussed further below. Communications between the secondary storage computing devices 704 and cloud storage sites 806A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 806A-N, the secondary storage computing device 804 may also perform local content indexing and/or local object-level, sub-object-level or block-level deduplication when performing storage operations involving various cloud storage sites 806A-N. Cloud storage sites 806A-N may further record and maintain, EM logs, map DTC codes, store repair and maintenance data, store operational data, and/or provide outputs from determinative algorithms that are located in cloud storage sites 806A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principles and define the mathematical relationship of a system, a pure machine learning model may not be derived from first principles. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a component of a dataset for certain algorithms, not all algorithms require a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by a model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstituting, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions. Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer," that the model is seeking to predict from the underlying relationships in the dataset. As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering, K-means classification, Fuzzy C-Means, Gaussian Mixture, Hidden Markov Model, Neural Networks, and Hierarchical algorithms.

Figure 9:
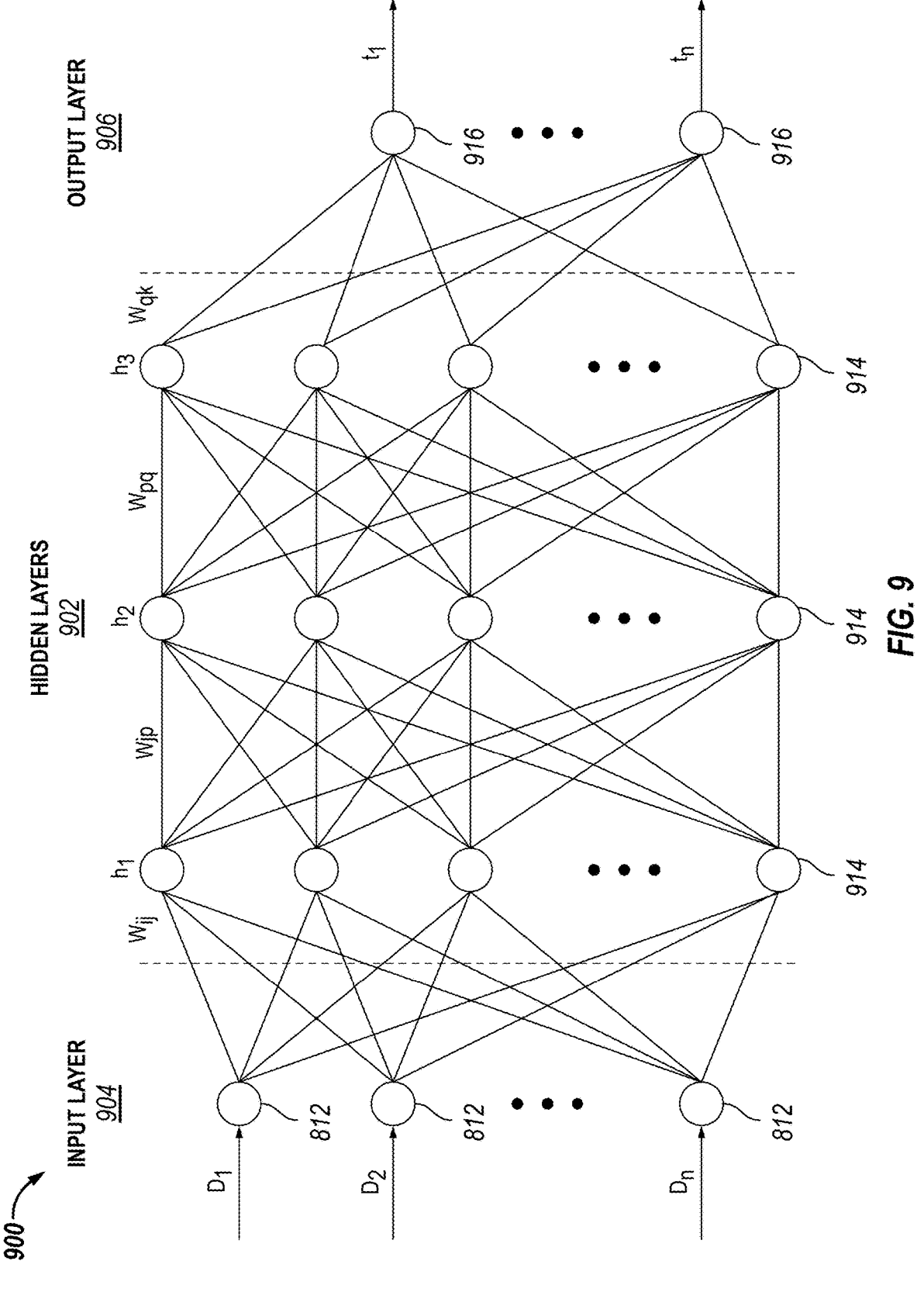
FIG. 9 illustrates a neural network.

In examples to determine a relationship using machine learning, a neural network (NN) 900, as illustrated in FIG. 9, may be utilized to model a three-dimensional finite element BHA to analyze lateral deflection experienced by BHA 116 (e.g., referring to FIG. 1) in both its lateral deflection in both inclination and pseudo-azimuth planes in a curved borehole 116 (e.g., referring to FIG. 1). FIG. 9 illustrates neural network (NN) 900. NN 900 may operate utilizing one or more information handling systems 120 (e.g., referring to FIG. 1) on computing network 800. Although a NN is illustrated, multiple models may be used with input output structures. These models may include flexible empirical models such as NN, gaussian processing methods, kriging methods, evolutionary methods such as genetic algorithms, classification methods, clustering methods empirical methods, or physics based methods such as equations of state, thermodynamic models, geological, geochemistry, or chemistry models, or kinetic models or any combinations therein including recursive combinations of similar or dissimilar models and iterative model combinations. A NN 900 is an artificial neural network with one or more hidden layers 902 between input layer 904 and output layer 906. In examples, NN 900 may be software on a single information handling system 120. In other examples, NN 900 may software running on multiple information handling systems 120 connected wirelessly and/or by a hard-wired connection in a network of multiple information handling systems 120. Herein, NN 900 may be applied in a wide array of implementations.

During operations, inputs 908 data are given to neurons 912 in input layer 904. Neurons 912, 914, and 916 are defined as individual or multiple information handling systems 120 connected in a computing network 800. The output from neurons 912 may be transferred to one or more neurons 914 within one or more hidden layers 902. Hidden layers 902 includes one or more neurons 914 connected in a network that further process information from neurons 912. The number of hidden layers 902 and neurons 912 in hidden layer 902 may be determined by personnel that designs NN 900. Hidden layers 902 is defined as a set of information handling system 120 assigned to specific processing. Hidden layers 802 spread computation to multiple neurons 912, which may allow for faster computing, processing, training, and learning by NN 900. Output from NN 900 may be computed by neurons 916. An information handling system 120 (e.g., referring to FIG. 1) being utilized in a computing network 800, NN 900, or alone may control measurement operations downhole with pulsed neutron logging tool 132. Specifically, information regarding a neutron to gamma ray timing may be computed and utilized by information handling system 120 during measurement operations in which pulsed neutron generator 308 (e.g., referring to FIG. 3) is pulsed. In a sub-µs time domain, fast neutrons and inelastic gamma rays 320 dominate, whereas in a 10-1000 µs time range, thermal neutrons 328 are bouncing around and capture gamma rays are detected.

Figures 10, 11:
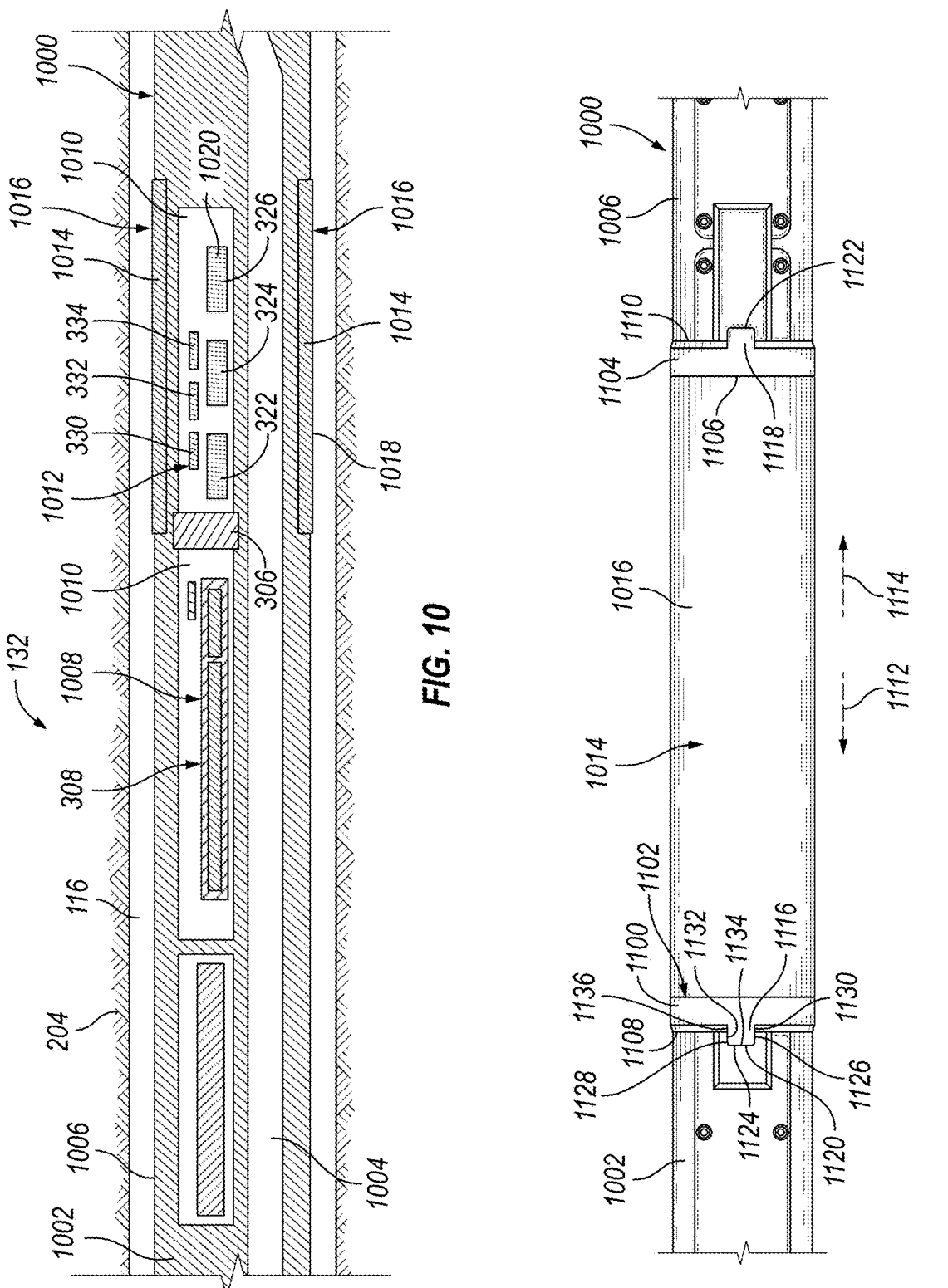
FIG. 10 is a cross-sectional view of a thermal neutron absorbing sleeve disposed about a pulsed neutron logging tool.
FIG. 11 illustrates a thermal neutron absorbing sleeve having locking end rings.

FIG. 10 is a cross-sectional view of a thermal neutron absorbing layer disposed within a pulsed neutron logging tool. As illustrated, the pulsed neutron logging tool 132 may include a downhole tubular 1000 having a body portion 1002 formed between a central bore 1004 and a radially outer surface 1006 of the downhole tubular 1000. Further, the pulsed neutron logging tool 132 may include a neutron generator 1008 configured to emit neutrons, as set forth above. In particular, the neutron generator 1008 may be the pulsed neutron generator 308 configured to generate pulses of high energy neutrons that radiate outward from the pulsed neutron generator 308. Moreover, the neutron generator 1008 may be housed within the body portion 1002. As illustrated, the neutron generator 1008 may be disposed within a cavity 1010 formed in the body portion 1002. Having the neutron generator 1008 disposed within the cavity 1010 may help protect the neutron generator 1008 from downhole conditions. However, the neutron generator 1008 may be disposed in any suitable position. Additionally, the pulsed neutron logging tool 132 may include at least one gamma ray detector 1020 (e.g., near gamma ray detector 322, far gamma ray detector 324, and/or far gamma ray detector 326), which may also be housed within the body portion 1002 (e.g., within the cavity 1010 formed in the body portion 1002). Further, the pulsed neutron logging tool 132 may include at least one thermal neutron detector 1012 (e.g., the near thermal neutron detector 330, the far thermal neutron detector 332, and/or the long thermal neutron detector 334), which may also be housed within the body portion 1002. The at least one thermal neutron detector 1012 is configured to detect thermal neutrons formed via interactions between the emitted neutrons and the downhole formation 204.

Further, the pulsed neutron logging tool 132 may include the shielding 306 disposed within the downhole tubular 1000 between the pulsed neutron generator 308 and the at least one gamma ray detector 1020. As illustrated, the shielding 306 may also be disposed within the cavity 1010. However, the shielding 306 may be disposed in any suitable location. The shielding 306 is configured to at least partially prevent neutrons from passing through the shielding 306. That is, the shielding 306 may at least partially prevent the neutrons emitted from the neutron generator 1008 from traveling directly from the neutron generator 1008 to the at least one thermal neutron detector 1012, which may saturate the at least one neutron detector 1012 and reduce effectiveness of the pulsed neutron logging tool 132.

As set forth above, the pulsed neutron generator 308 is configured to emit neutrons that penetrate into the downhole formations 204 around the pulsed neutron logging tool 132. Interactions between the emitted neutrons and the downhole formations 204 may form thermal neutrons, which may be reflected back toward the at least one neutron detector 1012 of the pulsed neutron logging tool 132. The pulsed neutron logging tool 132 may determine the geochemistry of the downhole formation 204 via analyzing the data from the thermal neutrons received by the at least one neutron detector 1012. Moreover, the neutrons emitted via the pulsed neutron generator 308 may be emitted into areas other than the downhole formation 204. For example, the neutrons may be emitted into the drilling mud, into the borehole 116, into an area surrounding the neutron generator tube, and/or other areas. Emitting the neutrons into these other areas may create thermal neutron radiation, which may hinder the effectiveness of the pulsed neutron logging tool 132. For example, the drilling mud includes water, water includes hydrogen, and hydrogen "down scatters" neutrons, which creates thermal neutron radiation. The thermal neutron radiation causes unwanted noise (i.e., creates an additional signal) which may be detected by the at least one neutron detector 1012. As such, the thermal neutron radiation from the drilling mud obscures the desirable signal from the formation, which ultimately limits the data for analysis.

However, the pulsed neutron logging tool 132 may further include thermal neutron absorption layer 1014 configured to absorb neutrons from the thermal neutron radiation to reduce unwanted noise and improve effectiveness of the pulsed neutron logging tool 132. The thermal neutron absorption layer 1014 may include a boron carbide material, or any suitable material for absorbing the neutrons. As illustrated, the pulsed neutron logging tool 132 may include a sleeve 1016 having the thermal neutron absorption layer 1014. The sleeve 1016 may be disposed about the radially outer surface 1006 of the downhole tubular 1000 and axially positioned over at least a portion of the at least one thermal neutron detector 1012. Alternatively, the thermal neutron absorption layer 1014 may be disposed between the sleeve 1016 and a radially outer surface 1006 of the downhole tubular 1000, or within the body portion 1002 of the downhole tubular 1000. The thermal neutron absorption layer 1014 may be disposed in any suitable location between a radially outer sleeve surface 1018 of the sleeve 1016 and the at least one thermal neutron detector 1012.

FIG. 11 illustrates a thermal neutron absorbing sleeve having locking end rings. As set forth above, the sleeve 1016 may be disposed about the radially outer surface 1006 of the downhole tubular 1000 and axially positioned over at least a portion of the at least one gamma ray detector 1020 and/or the thermal neutron detector 1012 (shown in FIG. 10). Indeed, the sleeve 1016 may include the thermal neutron absorption layer 1014. Alternatively, the sleeve 1016 may not include the thermal neutron absorption layer 1014 but may instead be configured to protect the thermal neutron absorption layer 1014 from downhole conditions. For example, the thermal neutron absorption layer 1014 may be sprayed onto the radially outer surface outer surface 1006 of the downhole tubular 1000 (e.g., collar). As such, the sleeve 1016 may be disposed about the downhole tubular 1000 over the thermal neutron absorption layer 1014 to protect the thermal neutron absorption layer 1014 from debris and/or other conditions that may cause wear to the thermal neutron absorption layer 1014.

Moreover, the sleeve 1016 may include a first end ring 1100 secured to a first axial end 1102 of the sleeve 1016 and a second end ring 1104 secured to a second axial end 1106 of the sleeve 1016. As set forth in greater detail below, the sleeve 1016 may include a plurality of layers. To reduce a risk of delamination, the first end ring 1100 and the second end ring 1104 may cap the respective ends of the sleeve 1016. Additionally, the first end ring 1100 and the second end ring 1104 may help restrain axial movement of the sleeve 1016 with respect to the downhole tubular 1000. In particular, the first end ring 1100 and the second end ring 1104 may interface with the downhole tubular 1000 to restrain axial movement. For example, the body portion 1002 of the downhole tubular 1000 may include a first shoulder 1108 and a second shoulder 1110 each formed in the radially outer surface 1006 of the downhole tubular 1000. The first shoulder 1108 may interface with the first end ring 1100 to restrain axial movement of the sleeve 1016 with respect to the downhole tubular 1000 in an uphole direction 1112, and the second shoulder 1110 may interface with the second end ring 1104 to restrain axial movement of the sleeve 1016 with respect to the downhole tubular 1000 in a downhole direction 1114. However, the first end ring 1100 and the second end ring 1104 may interface with any suitable features of the downhole tubular 1000 to restrain axial movement of the sleeve 1016 with respect to the downhole tubular 1000.

Further, the sleeve 1016 may include one or more axial protrusion features. As illustrated, a first axial protrusion feature 1116 may be secured to the first end ring 1100 and a second axial protrusion feature 1118 may be secured to the second end ring 1104. The body portion 1002 of the downhole tubular 1000 may include corresponding end slots (e.g., a first end slot 1120 and a second end slot 1122) configured to receive the respective axial protrusions 1116, 1118. That is, the first end slot 1120 is configured to receive the first axial protrusion feature 1116 and the second end slot 1122 is configured to receive the second axial protrusion feature 1118. Respective interfaces between the axial protrusion features 1116, 1118 and the end slots 1120, 1122 may restrain rotational movement of the sleeve 1016 with respect to the downhole tubular 1000.

For example, as set forth above, the first end slot 1120 is configured to receive the first axial protrusion feature 1116. The first end slot 1120 may extend radially into the body portion 1002 from the radially outer surface 1006 of the downhole tubular 1000. As illustrated, the first end slot 1120 may include a rectangular profile having an axial sidewall 1124, a first circumferential sidewall 1126, and a second circumferential sidewall 1128. However, the first end slot 1120 may include any suitable profile shape. Further, the first axial protrusion feature 1116 may include a corresponding shape. As illustrated, the first axial protrusion feature 1116 includes a first circumferential face 1130 configured to interface with the first circumferential sidewall 1126 and a second circumferential face 1132 configured to interface with the second circumferential sidewall 1128. Such interfaces may restrain rotational movement of the sleeve 1016 with respect to the downhole tubular 1000. Further, the first axial protrusion feature 1116 may include an axial face 1134, which may be axially offset from the axial sidewall 1124 to avoid applying axial stress to the first axial protrusion feature 1116.

Moreover, as illustrated, a circumferential width of each end slot 1120, 1122 may be greater than a circumferential width of the corresponding axial protrusion feature (e.g., first axial protrusion feature 1116 or the second axial protrusion feature 1118) to permit between one degree and ten degrees of rotational movement of the sleeve 1016 with respect to the downhole tubular 1000. For example, the first axial protrusion feature 1116 may be disposed within the first end slot 1120 with the first circumferential face 1130 interfacing with the first circumferential sidewall 1126. As the circumferential width (e.g., arc length) of the first end slot 1120 may be greater than the circumferential width of the first axial protrusion feature 1116, there may be a gap 1136 between the second circumferential face 1132 and the second circumferential sidewall 1128. During operations, the sleeve 1016 may rotate between a counterclockwise position with the first circumferential face 1130 interfaced with the first circumferential sidewall 1126 and a clockwise position with the second circumferential face 1132 interfaced with the second circumferential sidewall 1128. The sleeve 1016 may rotate between one degree and ten degrees of rotational movement with respect to the downhole tubular 1000 based at least in part on the respective circumferential widths of the end slots 1120, 1122 and the axial protrusion features 1116, 1118.

Further, the sleeve 1016 may be removable from the downhole tubular between downhole operations. The downhole operations may cause the sleeve 1016 to wear. The downhole tubular 1000 may include one or more features configured to hold the sleeve 1016 in position. Such features may be adjustable and/or removable to release the sleeve 1016 to slide off the downhole tubular 1000. Once removed, the sleeve 1016 may be replaced.

Figure 12:
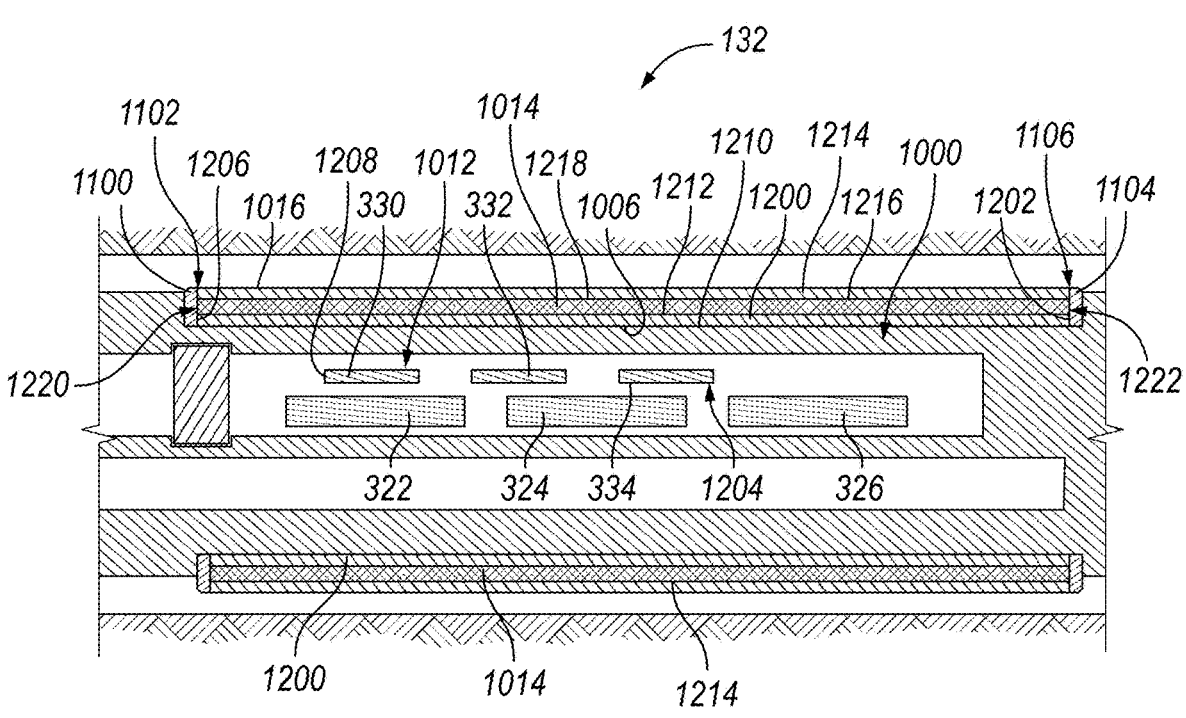
FIG. 12 is a cross-sectional view of a multilayer thermal neutron absorbing sleeve.

FIG. 12 is a cross-sectional view of a multilayer thermal neutron absorbing sleeve. As illustrated, the sleeve 1016 may include an inner tubular 1200 configured to be positioned over a portion of a downhole tubular 1000 that houses the at least one thermal neutron detector 1012 (e.g., the near thermal neutron detector 330, the far thermal neutron detector 332, and/or the long thermal neutron detector 334). The inner tubular 1200 may be axially longer than the at least one thermal neutron detector 1012 (i.e., axially longer than a combination of the near thermal neutron detector 330, the far thermal neutron detector 332, and/or the long thermal neutron detector 334) and positioned such that a lower end 1202 of the inner tubular 1200 is disposed further downhole than a lower detector end 1204 of the at least one thermal neutron detector 1012 and such that an upper end 1206 of the inner tubular 1200 is disposed further uphole than an upper detector end 1208 of the at least one thermal neutron detector 1012.

Additionally, the pulsed neutron logging tool 132 may include the near gamma ray scintillator detector 322, the far gamma ray scintillator detector 324, and the long gamma ray scintillator detector 326, which may also be housed within the body portion 1002 (e.g., within the cavity 1010 formed in the body portion 1002). The inner tubular 1200 of the sleeve 1016 may also be positioned over the near gamma ray scintillator detector 322, a far gamma ray scintillator detector 324, and a long gamma ray scintillator detector 326. That is, the inner tubular 1200 may be axially longer than the near gamma ray scintillator detector 322, a far gamma ray scintillator detector 324, and a long gamma ray scintillator detector 326. For example, the long gamma ray scintillator detector 326 may be positioned downhole from the far gamma ray scintillator detector 324, and the far gamma ray scintillator detector 324 may be positioned downhole from the near gamma ray scintillator detector 322. In this example, the lower end 1202 of the inner tubular 1200 may be disposed further downhole than a lower end of the long gamma ray scintillator detector 326 and the upper end 1206 of the inner tubular 1200 may be disposed further uphole than an upper end of the near gamma ray scintillator detector 322.

Further, during operation, a radially inner surface 1210 of the inner tubular 1200 may interface with the radially outer surface 1006 of the downhole tubular 1000. Alternatively, the radially inner surface 1210 of the inner tubular 1200 may interface with a thermal neutron absorption layer 1014 applied to the radially outer surface 1006 of the downhole tubular 1000 (shown in FIG. 15). The inner tubular 1200 may include a metallic material such as Inconel, steel, nickel, copper, titanium, chromium, or any suitable metallic material. However, the inner tubular 1200 may include any suitable material.

The sleeve 1016 may further include the thermal neutron absorption layer 1014 disposed about the inner tubular 1200. The thermal neutron absorption layer 1014 may span the radially outer surface of the inner tubular 1200 such that the thermal neutron absorption layer 1014 has a substantially tubular shape. The thermal neutron absorption layer 1014 may include a coating or spray applied directly to a radially outer surface 1212 of the inner tubular 1200. Alternatively, the thermal neutron absorption layer 1014 may include a tubular shaped feature secured to the radially outer surface 1212 of the inner tubular 1200. As set forth above, the thermal neutron absorption layer 1014 may include a boron carbide material configured to absorb neutrons from the thermal neutron radiation to reduce unwanted noise for the at least one thermal neutron detector 1012, which may improve the effectiveness of the pulsed neutron logging tool 132. However, the thermal neutron absorption layer 1014 may include any suitable material for absorbing neutrons from the thermal neutron radiation.

Moreover, the sleeve 1016 may include a protective layer 1214 disposed about the inner tubular 1200 and the thermal neutron absorption layer 1014 such that the thermal neutron absorption layer 1014 is disposed between the protective layer 1214 and the inner tubular 1200. That is, the thermal neutron absorption layer 1014 may interface with the radially outer surface 1212 of the inner tubular 1200 and a radially inner surface 1216 of the protective layer 1214. The protective layer 1214 is configured to shield the thermal neutron absorption layer 1014 from downhole conditions to reduce wear on the thermal neutron absorption layer 1014. As such, the protective layer 1214 may span the entire radially outer surface 1218 of the thermal neutron absorption layer 1014. Indeed, the protective layer 1214 may have a substantially tubular shape with an axial length equal to or greater than the thermal neutron absorption layer 1014 such that the protective layer 1214 covers the entire radially outer surface 1218 of the thermal neutron absorption layer 1014. Further, the protective layer 1214 may include a fiberglass material. However, the protective layer 1214 may include any suitable material for shielding the thermal neutron absorption layer 1014 from downhole conditions.

Moreover, as set forth above, the sleeve 1016 may include the first end ring 1100 and the second end ring 1104. As illustrated, the first end ring 1100 is secured to the upper end 1206 of the inner tubular 1200 of the sleeve 1016 and the second end ring 1104 is secured to the lower end 1202 of the inner tubular 1200 of the sleeve 1016. However, the first end ring 1100 and the second end ring 1104 may be secured to any suitable portion of the sleeve 1016. For example, the first end ring 1100 and the second end ring 1104 may be secured to corresponding axial ends of both the inner tubular 1200 and the protective layer 1214. Alternatively, the first end ring 1100 and the second end ring 1104 may be secured to only the protective layer 1214. However, as set forth above, the first end ring 1100 and the second end ring 1104 are configured to cap the respective ends (e.g., the first axial end 1102 and the second axial end 1106) of the sleeve 1016. Specifically, respective inner faces of the first end ring 1100 (e.g., a first inner face 1220) and the second end ring 1104 (e.g., a second inner face 1222) are configured to interface with each of the layers (e.g., the inner tubular 1200, the thermal neutron absorption layer 1014, the protective layer 1214, etc.) of the sleeve 1016 to cap the respective ends of the sleeve 1016 to reduce the risk of delamination of the sleeve 1016.

Figure 13:
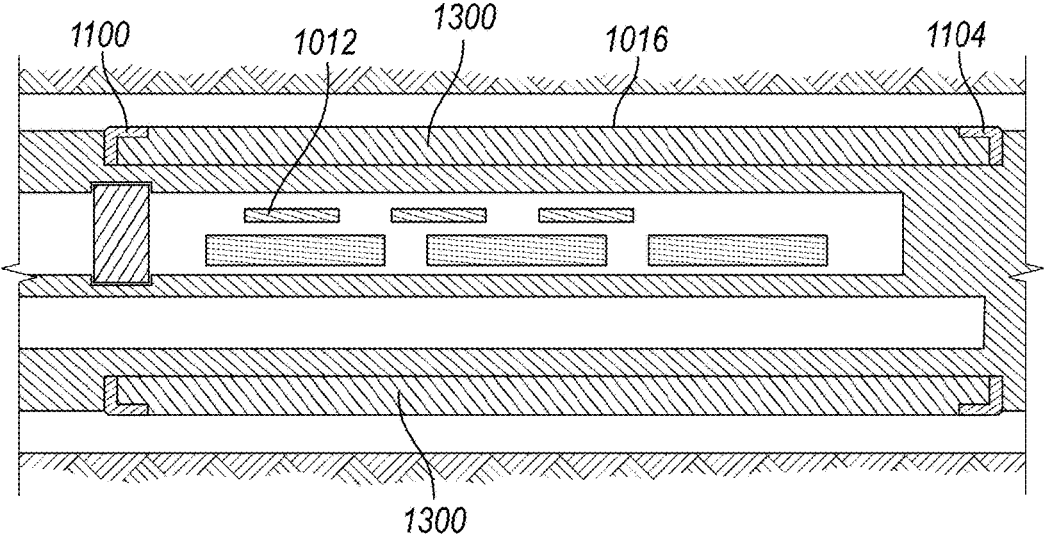
FIG. 13 is a cross-sectional view of a composite thermal neutron absorbing sleeve.

FIG. 13 is a cross-sectional view of a composite thermal neutron absorbing sleeve. As illustrated, the sleeve 1016 may include a single layer of composite material 1300 disposed between the first end ring 1100 and the second end ring 1104. The thermal neutron absorption layer 1014 may formed within the sleeve 1016 as part of the composite material 1300. That is, the boron carbide material, or other suitable material, of the thermal neutron absorption layer 1014 may be included in the composite material 1300. For example, the composite material 1300 may include a fiberglass material, a boron carbide powder, and an epoxy resin. However, any suitable material may be included in the composite material 1300. The boron carbide powder may be mixed throughout the composite material 1300 such that the sleeve 1016 may absorb neutrons from the thermal neutron radiation to reduce unwanted noise for the at least one thermal neutron detector 1012.

Figure 14:
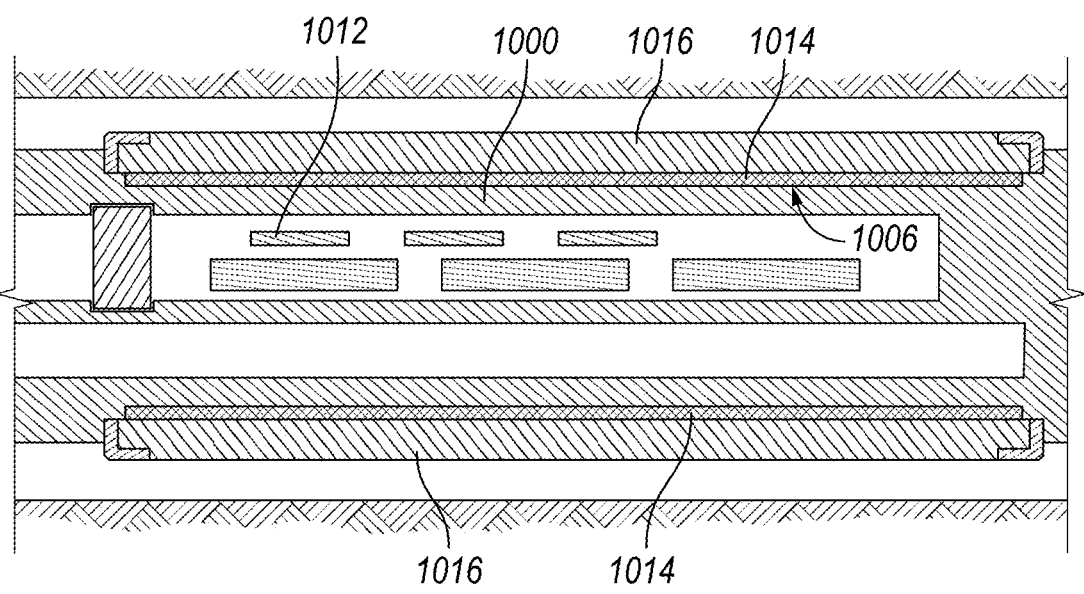
FIG. 14 is a cross-sectional view of a protective sleeve disposed about a thermal neutron absorbing layer formed on a pulsed neutron logging tool.

FIG. 14 is a cross-sectional view of a protective sleeve disposed about a thermal neutron absorbing layer formed on a pulsed neutron logging tool. As illustrated, the thermal neutron absorption layer 1014 may be applied (e.g., coated, sprayed, etc.) directly to the radially outer surface 1006 of the downhole tubular 1000. The thermal neutron absorption layer 1014 may cover the entire circumference of the portion of the downhole tubular 1000 housing the at least one thermal neutron detector 1012. Further, the thermal neutron absorption layer 1014 may extend axially from an upper position (e.g., uphole from the at least one thermal neutron detector 1012) to a lower position (e.g., downhole from the at least one thermal neutron detector 1012). As such, the thermal neutron absorption layer 1014 may at least be disposed radially between the at least one thermal neutron detector 1012 and the thermal neutron radiation set forth above, which may allow the thermal neutron absorption layer 1014 to adequately absorb neutrons to reduce unwanted noise for the at least one thermal neutron detector 1012.

Moreover, the sleeve 1016 may be disposed about the radially outer surface 1006 of the downhole tubular 1000 and the thermal neutron absorption layer 1014. As set forth above, the sleeve 1016 may be configured to protect the thermal neutron absorption layer 1014 from downhole conditions. In particular, the sleeve 1016 may be disposed about the downhole tubular 1000 over the thermal neutron absorption layer 1014 to protect the thermal neutron absorption layer 1014 from debris and/or other conditions that may cause wear to the thermal neutron absorption layer 1014.

Figure 15:
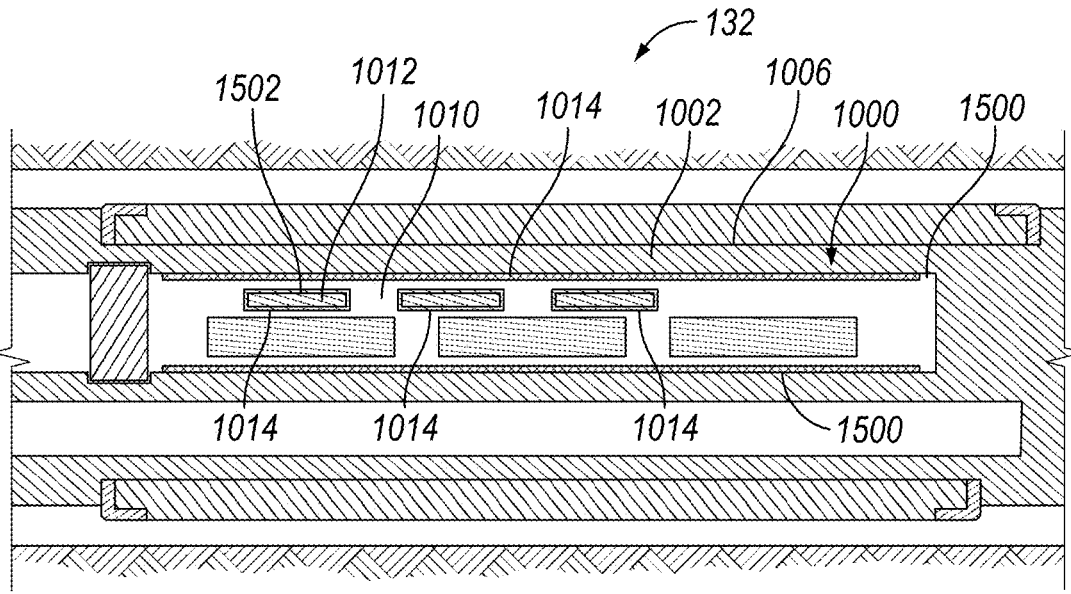
FIG. 15 is a cross-sectional view of a thermal neutron absorbing layer formed about a neutron detector disposed within a pulsed neutron logging tool.

FIG. 15 is a cross-sectional view of a thermal neutron absorbing layer formed about a neutron detector disposed within a pulsed neutron logging tool. As set forth above, the pulsed neutron logging tool 132 includes the downhole tubular 1000 with the body portion 1002. The pulsed neutron logging tool 132 may include the at least one thermal neutron detector 1012, which may be housed within the body portion 1002 of the downhole tubular 1000. As illustrated, the at least one thermal neutron detector 1012 may be disposed within the cavity 1010 formed in the body portion 1002. However, the at least one thermal neutron detector 1012 may be disposed in any suitable position within the body portion 1002 of the downhole tubular 1000.

Further, the thermal neutron absorption layer 1014 may be disposed within the body portion 1002 of the downhole tubular 1000. For example, as illustrated, the thermal neutron absorption layer 1014 may be applied to an inner surface 1500 of the body portion 1002 that defines the cavity 1010. In particular, the thermal neutron absorption layer 1014 may be coated onto a portion of the inner surface 1500 of the body portion 1002 disposed proximate the at least one thermal neutron detector 1012. Alternatively, the thermal neutron absorption layer 1014 may be applied directly to an outer surface 1502 of the at least one thermal neutron detector 1012. Further, the thermal neutron absorption layer 1014 may be disposed within the body portion 1002 between the at least one thermal neutron detector 1012 and the radially outer surface 1006 of the downhole tubular 1000. Indeed, the thermal neutron absorption layer 1014 may be disposed in any suitable position for absorbing neutrons from the thermal neutron radiation to reduce unwanted noise for the at least one thermal neutron detector 1012.

The methods and systems described above are an improvement over the current technology as the methods and systems described herein provide a pulsed neutron logging tool having a thermal neutron absorption layer configured to absorb neutrons from thermal neutron radiation to reduce unwanted noise and improve effectiveness of the pulsed neutron logging tool. The systems and methods may comprise any of the various features disclosed herein, comprising one or more of the following statements.

Statement 1. A downhole system, comprising: a downhole tubular having a body portion formed between a central bore and a radially outer surface of the downhole tubular; a neutron generator housed within the body portion and configured to emit neutrons; a gamma ray detector housed within the body portion and configured to detect gamma rays formed via interactions between the emitted neutrons and a downhole formation; a sleeve disposed about the radially outer surface of the downhole tubular, wherein the sleeve is axially positioned over at least a portion of the gamma ray detector; and a thermal neutron absorption layer disposed between a radially outer surface of the sleeve and the gamma ray detector.

Statement 2. The downhole system of statement 1, wherein the neutron generator is a pulsed neutron generator configured to generate pulses of high energy neutrons that radiate outward from pulsed neutron generator.

Statement 3. The downhole system of statement 1 or statement 2, further comprising a shielding disposed within the downhole tubular between the pulsed neutron generator and the gamma ray detector, wherein the shielding is configured to at least partially prevent neutrons from passing through the shielding.

Statement 4. The downhole system of any preceding statement, wherein the thermal neutron absorption layer comprises a boron carbide material.

Statement 5. The downhole system of any preceding statement, further comprising at least one cavity formed within the body portion, and wherein the neutron generator and the gamma ray detector are disposed within the at least one cavity.

Statement 6. The downhole system of any preceding statement, wherein the sleeve includes an outer protective layer configured to shield the thermal neutron absorption layer from downhole conditions to reduce wear on the thermal neutron absorption layer.

Statement 7. The downhole system of any preceding statement, wherein the sleeve is removable.

Statement 8. The downhole system of any preceding statement, wherein the sleeve includes an inner tubular and a protective layer disposed about the inner tubular, and wherein the thermal neutron absorption layer is disposed between the inner tubular and the protective layer.

Statement 9. The downhole system of any preceding statement, wherein the sleeve further includes a first end ring secured to a first axial end of the sleeve and a second end ring secured to a second axial end of the sleeve, wherein body portion further includes a first shoulder and a second shoulder, wherein the first shoulder is configured to interface with the first end ring to restrain axial movement of the sleeve with respect to the downhole tubular in an uphole direction, and wherein the second shoulder is configured to interface with the second end ring to restrain axial movement of the sleeve with respect to the downhole tubular in a downhole direction.

Statement 10. The downhole system of any preceding statement, wherein the sleeve comprises an axial protrusion feature, wherein the body portion comprises an end slot configured to receive the axial protrusion feature, wherein an interface between the axial protrusion feature and the end slot are configured to restrain rotational movement of the sleeve with respect to the downhole tubular.

Statement 11. The downhole system of any preceding statement, wherein a circumferential width of the end slot is greater than a circumferential width of the axial protrusion to permit between one degree and ten degrees of rotational movement of the sleeve with respect to the downhole tubular.

Statement 12. The downhole system of any preceding statement, wherein the sleeve comprises a composite material, wherein the thermal neutron absorption layer is formed within the sleeve as part of the composite material, and wherein composite material includes a fiberglass material, a boron carbide powder, and an epoxy resin.

Statement 13. The downhole system of any preceding statement, wherein the thermal neutron absorption layer is sprayed onto the radially outer surface of the downhole tubular.

Statement 14. The downhole system of any preceding statement, wherein the thermal neutron absorption layer is disposed within the body portion of the downhole tubular.

Statement 15. A thermal neutron absorption sleeve, comprising: an inner tubular configured to be positioned over a portion of a downhole tubular that houses a gamma ray detector configured to detect gamma rays formed via interactions between neutrons emitted from a neutron generator and a downhole formation; a protective layer disposed about the inner tubular; and a thermal neutron absorption layer disposed between the protective layer and the inner tubular, wherein the thermal neutron absorption layer is configured to reduce thermal neutron radiation for the gamma ray detector.

Statement 16. The thermal neutron absorption sleeve of statement 15, wherein the protective layer comprises a fiberglass material.

Statement 17. The thermal neutron absorption sleeve of statement 15 or statement 16, further comprising a first end ring secured to a first end of the inner tubular and a second end ring secured to a second end of the inner tubular, wherein the first end ring and the second end ring are configured to interface the downhole tubular to restrain axial movement of the thermal neutron absorption sleeve with respect to the downhole tubular.

Statement 18. The thermal neutron absorption sleeve of any of statements 15-17, further comprising an axial protrusion feature secured to the first end ring, wherein the axial protrusion feature is configured to interface with a corresponding end slot of the downhole tubular to restrain rotational movement of the sleeve with respect to the downhole tubular.

Statement 19. The thermal neutron absorption sleeve of any of statements 15-18, wherein the thermal neutron radiation is formed via interactions between the neutrons emitted from the neutron generator and a downhole drilling fluid.

Statement 20. A downhole system, comprising: a downhole tubular having a body portion formed between a central bore and a radially outer surface of the downhole tubular, and wherein the body portion includes at least one end slot formed in a radially outer surface of the body portion; a neutron generator housed within the body portion and configured to emit neutrons; a gamma ray detector housed within the body portion and configured to detect gamma rays formed via interactions between the emitted neutrons and a downhole formation; a sleeve disposed about the radially outer surface of the downhole tubular, wherein the sleeve is axially aligned with the gamma ray detector; at least one end ring secured to a corresponding axial end of the sleeve and having an axial protrusion feature extending axially from the at least one end ring, wherein the axial protrusion feature is configured to interface with the at least one end slot to restrain rotation of the sleeve with respect to the downhole tubular; and a thermal neutron absorption layer disposed between a radially outer surface of the sleeve and the gamma ray detector.

As it is impracticable to disclose every conceivable embodiment of the technology described herein, the figures, examples, and description provided herein disclose only a limited number of potential embodiments. One of ordinary skill in the art would appreciate that any number of potential variations or modifications may be made to the explicitly disclosed embodiments, and that such alternative embodiments remain within the scope of the broader technology. Accordingly, the scope should be limited only by the attached claims. Further, the compositions and methods are described in terms of "comprising," "containing," or "including" various components or steps, the compositions and methods may also "consist essentially of" or "consist of" the various components and steps. Moreover, the indefinite articles "a" or "an," as used in the claims, are defined herein to mean one or more than one of the elements that it introduces. Certain technical details, known to those of ordinary skill in the art, may be omitted for brevity and to avoid cluttering the description of the novel aspects.

For further brevity, descriptions of similarly named components may be omitted if a description of that similarly named component exists elsewhere in the application. Accordingly, any component described with respect to a specific figure may be equivalent to one or more similarly named components shown or described in any other figure, and each component incorporates the description of every similarly named component provided in the application (unless explicitly noted otherwise). A description of any component is to be interpreted as an optional embodiment— which may be implemented in addition to, in conjunction with, or in place of an embodiment of a similarly—named component described for any other figure.

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" may be used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

What is claimed is:

1. A downhole system, comprising:
   a downhole tubular having a body portion formed between a central bore and a radially outer surface of the downhole tubular;
   a neutron generator housed within the body portion and configured to emit neutrons;
   a gamma ray detector housed within the body portion and configured to detect gamma rays formed via interactions between the emitted neutrons and a downhole formation;
   a sleeve disposed about the radially outer surface of the downhole tubular, wherein the sleeve is axially positioned over at least a portion of the gamma ray detector;
   at least one feature configured to restrain axial movement of the sleeve, wherein the at least one feature is adjusted, removed, or some combination thereof, to release the sleeve to slide off the downhole tubular; and
   a thermal neutron absorption layer disposed between a radially outer surface of the sleeve and the gamma ray detector.

2. The downhole system of claim 1, wherein the neutron generator is a pulsed neutron generator configured to generate pulses of high energy neutrons that radiate outward from pulsed neutron generator.

3. The downhole system of claim 2, further comprising a shielding disposed within the downhole tubular between the pulsed neutron generator and the gamma ray detector, wherein the shielding is configured to at least partially prevent neutrons from passing through the shielding.

4. The downhole system of claim 1, wherein the thermal neutron absorption layer comprises a boron carbide material.

5. The downhole system of claim 1, further comprising at least one cavity formed within the body portion, and wherein the neutron generator and the gamma ray detector are disposed within the at least one cavity.

6. The downhole system of claim 1, wherein the sleeve includes an outer protective layer configured to shield the thermal neutron absorption layer from downhole conditions to reduce wear on the thermal neutron absorption layer.

7. The downhole system of claim 1, wherein the sleeve includes an inner tubular and a protective layer disposed about the inner tubular, and wherein the thermal neutron absorption layer is disposed between the inner tubular and the protective layer.

8. The downhole system of claim 1, wherein the sleeve further includes a first end ring secured to a first axial end of the sleeve and a second end ring secured to a second axial end of the sleeve, wherein body portion further includes a first shoulder and a second shoulder, wherein the first shoulder is configured to interface with the first end ring to restrain axial movement of the sleeve with respect to the downhole tubular in an uphole direction, and wherein the second shoulder is configured to interface with the second end ring to restrain axial movement of the sleeve with respect to the downhole tubular in a downhole direction.

9. The downhole system of claim 1, wherein the sleeve comprises an axial protrusion feature, wherein the body portion comprises an end slot configured to receive the axial protrusion feature, wherein an interface between the axial protrusion feature and the end slot are configured to restrain rotational movement of the sleeve with respect to the downhole tubular.

10. The downhole system of claim 9, wherein a circumferential width of the end slot is greater than a circumferential width of the axial protrusion feature to permit between one degree and ten degrees of rotational movement of the sleeve with respect to the downhole tubular.

11. A downhole system, comprising:
    a downhole tubular having a body portion formed between a central bore and a radially outer surface of the downhole tubular;
    a neutron generator housed within the body portion and configured to emit neutrons;
    a gamma ray detector housed within the body portion and configured to detect gamma rays formed via interactions between the emitted neutrons and a downhole formation;
    a sleeve disposed about the radially outer surface of the downhole tubular, wherein the sleeve is axially positioned over at least a portion of the gamma ray detector, wherein the sleeve comprises a composite material, wherein the thermal neutron absorption layer is formed within the sleeve as part of the composite material, and wherein composite material includes a fiberglass material, a boron carbide powder, and an epoxy resin:
    a thermal neutron absorption layer disposed between a radially outer surface of the sleeve and the gamma ray detector.

12. The downhole system of claim 1, wherein the thermal neutron absorption layer is sprayed onto the radially outer surface of the downhole tubular.

13. The downhole system of claim 1, wherein the thermal neutron absorption layer is disposed within the body portion of the downhole tubular.

14. A thermal neutron absorption sleeve, comprising:
    an inner tubular configured to be positioned over a portion of a downhole tubular that houses a gamma ray detector configured to detect gamma rays formed via interactions between neutrons emitted from a neutron generator and a downhole formation;

a protective layer disposed about the inner tubular;
    a thermal neutron absorption layer disposed between the protective layer and the inner tubular, wherein the thermal neutron absorption layer is configured to reduce thermal neutron radiation for the gamma ray detector;
    a first end ring secured to a first end of the inner tubular; and
    a second end ring secured to a second end of the inner tubular, wherein the first end ring and the second end ring are configured to interface the downhole tubular to restrain axial movement of the thermal neutron absorption sleeve with respect to the downhole tubular.

15. The thermal neutron absorption sleeve of claim 14, wherein the protective layer comprises a fiberglass material.

16. The thermal neutron absorption sleeve of claim 14, further comprising an axial protrusion feature secured to the first end ring, wherein the axial protrusion feature is configured to interface with a corresponding end slot of the downhole tubular to restrain rotational movement of the sleeve with respect to the downhole tubular.

17. The thermal neutron absorption sleeve of claim 14, wherein the thermal neutron radiation is formed via interactions between the neutrons emitted from the neutron generator and a downhole drilling fluid.

18. A downhole system, comprising:
    a downhole tubular having a body portion formed between a central bore and a radially outer surface of the downhole tubular, and wherein the body portion includes at least one end slot formed in a radially outer surface of the body portion;
    a neutron generator housed within the body portion and configured to emit neutrons;
    a gamma ray detector housed within the body portion and configured to detect gamma rays formed via interactions between the emitted neutrons and a downhole formation;
    a sleeve disposed about the radially outer surface of the downhole tubular, wherein the sleeve is axially aligned with the gamma ray detector;
    at least one end ring secured to a corresponding axial end of the sleeve and having an axial protrusion feature extending axially from the at least one end ring, wherein the axial protrusion feature is configured to interface with the at least one end slot to restrain rotation of the sleeve with respect to the downhole tubular; and
    a thermal neutron absorption layer disposed between a radially outer surface of the sleeve and the gamma ray detector.

19. The downhole system of claim 18, wherein the sleeve is removable.

20. The downhole system of claim 18, wherein the sleeve comprises a composite material, wherein the thermal neutron absorption layer is formed within the sleeve as part of the composite material, and wherein composite material includes a fiberglass material, a boron carbide powder, and an epoxy resin.

\*    \*    \*    \*    \*